United States Patent
Marques et al.

(10) Patent No.: US 10,006,352 B2
(45) Date of Patent: Jun. 26, 2018

(54) TURBINE WASTEGATE

(71) Applicant: Honeywell International Inc., Morris Plains, NJ (US)

(72) Inventors: Manuel Marques, Richardmenil (FR); Jean-Jacques Laissus, Thaon les Vosges (FR)

(73) Assignee: Honeywell International Inc., Morris Plains, NJ (US)

( * ) Notice: Subject to any disclaimer, the term of this patent is extended or adjusted under 35 U.S.C. 154(b) by 0 days. days.

(21) Appl. No.: 15/420,306

(22) Filed: Jan. 31, 2017

(65) Prior Publication Data

US 2017/0204782 A1    Jul. 20, 2017

Related U.S. Application Data

(63) Continuation of application No. 14/953,366, filed on Nov. 29, 2015, now Pat. No. 9,556,786, which is a continuation of application No. 14/199,942, filed on Mar. 6, 2014, now Pat. No. 9,200,532, which is a continuation-in-part of application No. 13/974,326, filed on Aug. 23, 2013, now Pat. No. 8,984,880, and a continuation-in-part of application No. 13/949,384, filed on Jul. 24, 2013, now Pat. No. 9,010,109, and a
(Continued)

(51) Int. Cl.
*F02B 37/18*    (2006.01)

(52) U.S. Cl.
CPC .......... *F02B 37/186* (2013.01); *F02B 37/183* (2013.01)

(58) Field of Classification Search
CPC ............................ F02B 37/186; F02B 37/183
USPC .......................................................... 60/602
See application file for complete search history.

(56) References Cited

U.S. PATENT DOCUMENTS 3,510,103 A    5/1970  Carsello
3,575,376 A *  4/1971  Arvidson, Jr. .......... F16K 5/204
                                                          251/160
(Continued)

FOREIGN PATENT DOCUMENTS

DE    1909257 A1 *  9/1969  ............... F16K 1/46
DE    3336879 A1 *  4/1985  ............... F16K 1/24
(Continued)

OTHER PUBLICATIONS

EP2921671—Notice of Opposition to a European Patent by BorgWatner Inc. (23 pages).
(Continued)

*Primary Examiner* — Jason T Newton
(74) *Attorney, Agent, or Firm* — Brian J. Pangrle

(57) ABSTRACT

A turbocharger wastegate assembly includes a turbine housing that includes a chamber and a bore where the bore includes a bore diameter; a bushing that includes a bushing bore, an exterior end, an interior end, a bushing bore diameter, an exterior surface diameter; and a monoblock wastegate that includes a shaft, a shoulder, an arm and a plug, where the shaft includes a shaft diameter that is less than the bushing bore diameter, where the shoulder includes a diameter that is greater than the bushing bore diameter and where, in an assembled state, the interior end of the bushing is disposed in the chamber and the exterior end of the bushing is disposed in an exterior space and where the interior end of the bushing and the shoulder of the monoblock wastegate contact to limit axial movement of the monoblock wastegate.

8 Claims, 22 Drawing Sheets

Related U.S. Application Data continuation-in-part of application No. 13/613,250, filed on Sep. 13, 2012, now Pat. No. 8,904,785.

(56) References Cited

U.S. PATENT DOCUMENTS

| | | | | |
|---|---|---|---|---|
| 4,121,607 | A * | 10/1978 | Bader | F16K 1/24 |
| | | | | 137/454.5 |
| 4,480,815 | A * | 11/1984 | Kreij | F16K 1/226 |
| | | | | 251/298 |
| 5,069,194 | A * | 12/1991 | Deutschmann | F02B 37/007 |
| | | | | 123/562 |
| 5,765,815 | A * | 6/1998 | Calvin | F16K 5/0657 |
| | | | | 251/175 |
| 5,934,645 | A | 8/1999 | Calvin | |
| 6,116,572 | A | 9/2000 | Schlattmann et al. | |
| 7,108,244 | B2 * | 9/2006 | Hardin | F16K 1/34 |
| | | | | 251/120 |
| 7,604,218 | B2 | 10/2009 | Kay | |
| 2004/0183046 | A1 * | 9/2004 | Bickell | F16K 25/005 |
| | | | | 251/315.16 |
| 2005/0167629 | A1 * | 8/2005 | Thiery | F02M 26/70 |
| | | | | 251/301 |
| 2006/0138378 | A1 * | 6/2006 | Kay | G05D 16/10 |
| | | | | 251/339 |
| 2007/0068496 | A1 * | 3/2007 | Wright | F02M 21/0239 |
| | | | | 123/527 |
| 2010/0187460 | A1 | 7/2010 | An et al. | |
| 2011/0000209 | A1 * | 1/2011 | Boening | F01D 17/20 |
| | | | | 60/602 |
| 2012/0060495 | A1 | 3/2012 | Jacob | |

FOREIGN PATENT DOCUMENTS

| | | | | |
|---|---|---|---|---|
| DE | 4439432 | C1 * | 11/1995 | F01N 3/2053 |
| DE | 19637633 | A1 | 4/1998 | |
| DE | 19637663 | A1 * | 4/1998 | F16K 1/08 |
| DE | 102006021185 | A1 * | 11/2007 | F01D 17/10 |
| EP | 1707790 | A1 * | 10/2006 | F02M 26/39 |
| EP | 2199564 | A1 | 6/2010 | |
| EP | 2444626 | A1 * | 4/2012 | F01D 17/105 |
| EP | 2489853 | A1 * | 8/2012 | F01D 17/105 |
| EP | 2708715 | A2 * | 3/2014 | G05D 16/10 |
| WO | 2004051388 | A2 | 6/2004 | |
| WO | WO 2009106161 | A1 * | 9/2009 | F01D 17/20 |
| WO | 2010135102 | A2 | 11/2010 | |
| WO | WO 2010135102 | A2 * | 11/2010 | F01D 17/105 |

OTHER PUBLICATIONS

EP2921671—Notice of Opposition to a European Patent by Bosch Mahle Inc. (15 pages).
EP Application No. 15 155 669.3, dated Jun. 19, 2017 (5 pages).
EP Application No. 15 155 650.3, dated Jun. 18, 2015 (4 pages).

* cited by examiner

US 10,006,352 B2

TURBINE WASTEGATE

RELATED APPLICATIONS

This application is a continuation of co-pending U.S. patent application Ser. No. 14/953,366, filed 29 Nov. 2015 (U.S. Pat. No. 9,556,786, issued 31 Jan. 2017), which is incorporated by reference herein, which is a continuation of U.S. patent application Ser. No. 14/199,942, filed 6 Mar. 2014 (U.S. Pat. No. 9,200,532, issued 1 Dec. 2015), which is incorporated by reference herein, which is a continuation-in-part of U.S. patent application Ser. No. 13/974,326, filed 23 Aug. 2013 (U.S. Pat. No. 8,984,880, issued 24 Mar. 2015), a continuation-in-part of U.S. patent application Ser. No. 13/949,384, filed 24 Jul. 2013 (U.S. Pat. No. 9,010,109, issued 21 Apr. 2015), and a continuation-in-part of U.S. patent application Ser. No. 13/613,250, filed 13 Sep. 2012 (U.S. Pat. No. 8,904,785, issued 9 Dec. 2014); all aforementioned US Patent Applications are incorporated by reference herein.

TECHNICAL FIELD

Subject matter disclosed herein relates generally to turbomachinery for internal combustion engines and, in particular, to turbine wastegates.

BACKGROUND

A turbine wastegate is typically a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate typically includes a flapper valve (e.g., a plug), a crank arm, a shaft or rod, and an actuator. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates and wastegate components are described herein, which can optionally provide for improved kinematics, reduced exhaust leakage, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
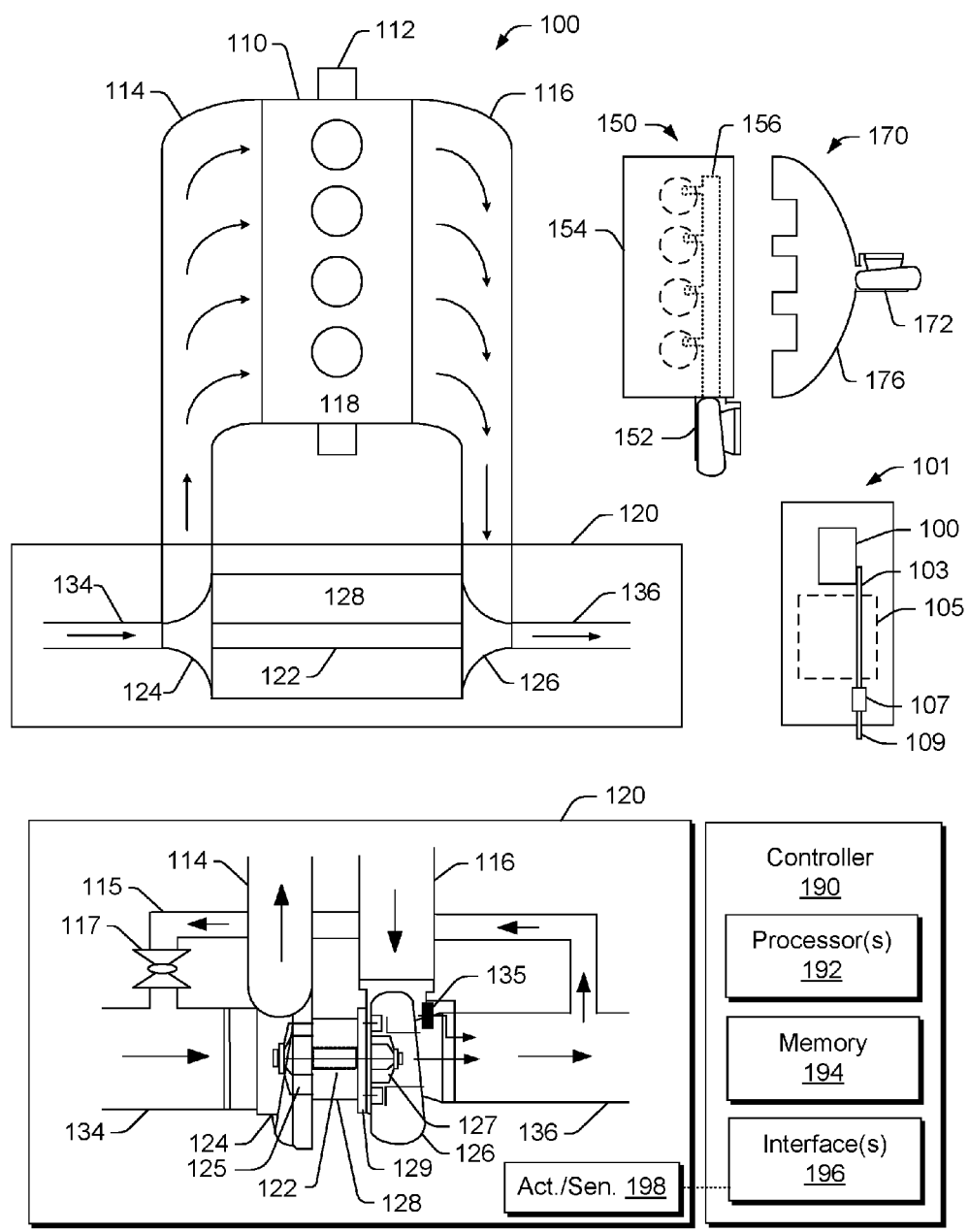
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
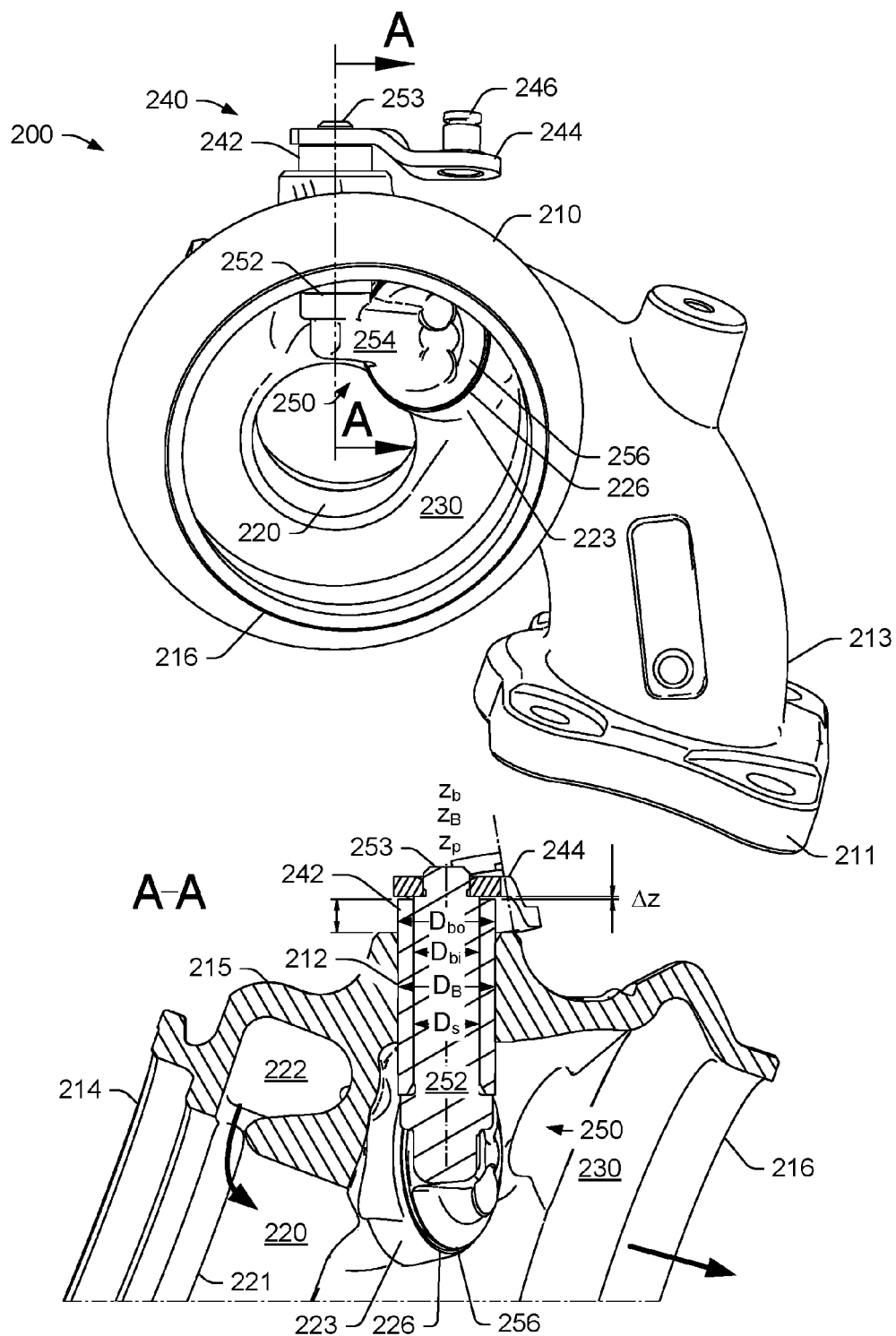
FIG. 2 is a series of view of an example of an assembly that includes a wastegate.

FIG. 2 shows an example of an assembly 200 that includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215, a wastegate wall 223 that extends to a wastegate seat 226, and an exhaust chamber 230. In the example of FIG. 2, the turbine housing 210 may be a single piece or multi-piece housing. As an example, the turbine housing 210 may be a cast component (e.g., formed via sand casting or other casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing 242 includes an inner diameter $D_{bi}$ and an outer diameter $D_{bo}$. In the example of FIG. 2, when the various components are assembled, the diameters may be as follows: $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

In the example of FIG. 2, a gap $\Delta z$ is shown between a surface of the bushing 242 and a surface of the control arm 244, which allows for axial movement of the shaft 252, for example, to facilitate self-centering of the plug 256 with respect to the wastegate seat 226.

As an example, the assembly 200 may be fitted to an exhaust conduit or other component of an internal combustion engine (see, e.g., examples of FIG. 1) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216.

As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

As an example, the control linkage 240 may exert a force that acts to force the plug 256 in a direction toward the wastegate seat 226. For example, an actuator may include a biasing mechanism (e.g., a spring, etc.) that exerts force, which may be controllably overcome, at least in part, for rotating the plug 256 away from the wastegate seat 226 (e.g., for wastegating). As an example, an actuator may be mounted to a turbocharger (e.g., mounted to a compressor assembly, etc.). As an example, an actuator may be a linear actuator, for example, that includes a rod that moves along an axis. Depending on orientation of a plug, a shaft, a control linkage and such a rod, to maintain the plug in a closed position, the rod may exert a downward force (e.g., away from the control linkage as in the example of FIG. 2) or the rod may exert an upward force (e.g., toward the control linkage). For example, where the control arm 244 (e.g., and the peg 246) of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, a rod of an actuator may be biased to exert a force on a control linkage that causes the control linkage to exert a force on a plug (see, e.g., the plug 256) such that the plug seats against a wastegate seat (see, e.g., the wastegate seat 226). In such an example, the actuator may at least in part overcome the force that biases the rod such that a shaft rotates the plug away from the wastegate seat. For example, in FIG. 2, to initiate wastegating, the entire plug 256 rotates about an axis of the shaft 252 and moves away from the wastegate seat 226 (e.g., without any portion of the plug 256 moving into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the control linkage 240 (e.g., the pressure differential acts to bias the plug 256 toward an open position). Accordingly, the closing force applied to the plug 256 should overcome pressure force from below the plug 256. Further, where the shaft 252 may include some play (see, e.g., Δz, etc.), the closing force applied to the plug 256 may cause the plug 256 to self-center with respect to the wastegate seat 226 (e.g., to facilitate sealing, to avoid exhaust leakage, etc.).

In the example of FIG. 2, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures<−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As an example, a plug may include a contact portion and a shell portion. For example, a plug may include a radiused portion as a contact portion that contacts a surface of a wastegate seat in a closed state and a shell portion that defines a flow passage with respect to the surface of the wastegate seat in an open state. In such an example, the shell portion may extend into a wastegate passage in the closed state (e.g., without contacting a surface that defines the wastegate passage, a surface of the wastegate seat, etc.). As an example, in an assembly, such a plug may be configured to self-center with respect to a wastegate seat (e.g., in a closed state). As an example, a surface of a wastegate seat may be conical, which may facilitate self-centering of a contact portion of a plug. As an example, one or more clearances may exist in an assembly for a wastegate shaft with respect to a bushing such that the wastegate shaft may move in a manner that allows for self-centering of a wastegate plug, operatively coupled to the wastegate shaft, with respect to a wastegate seat.

Figure 3:
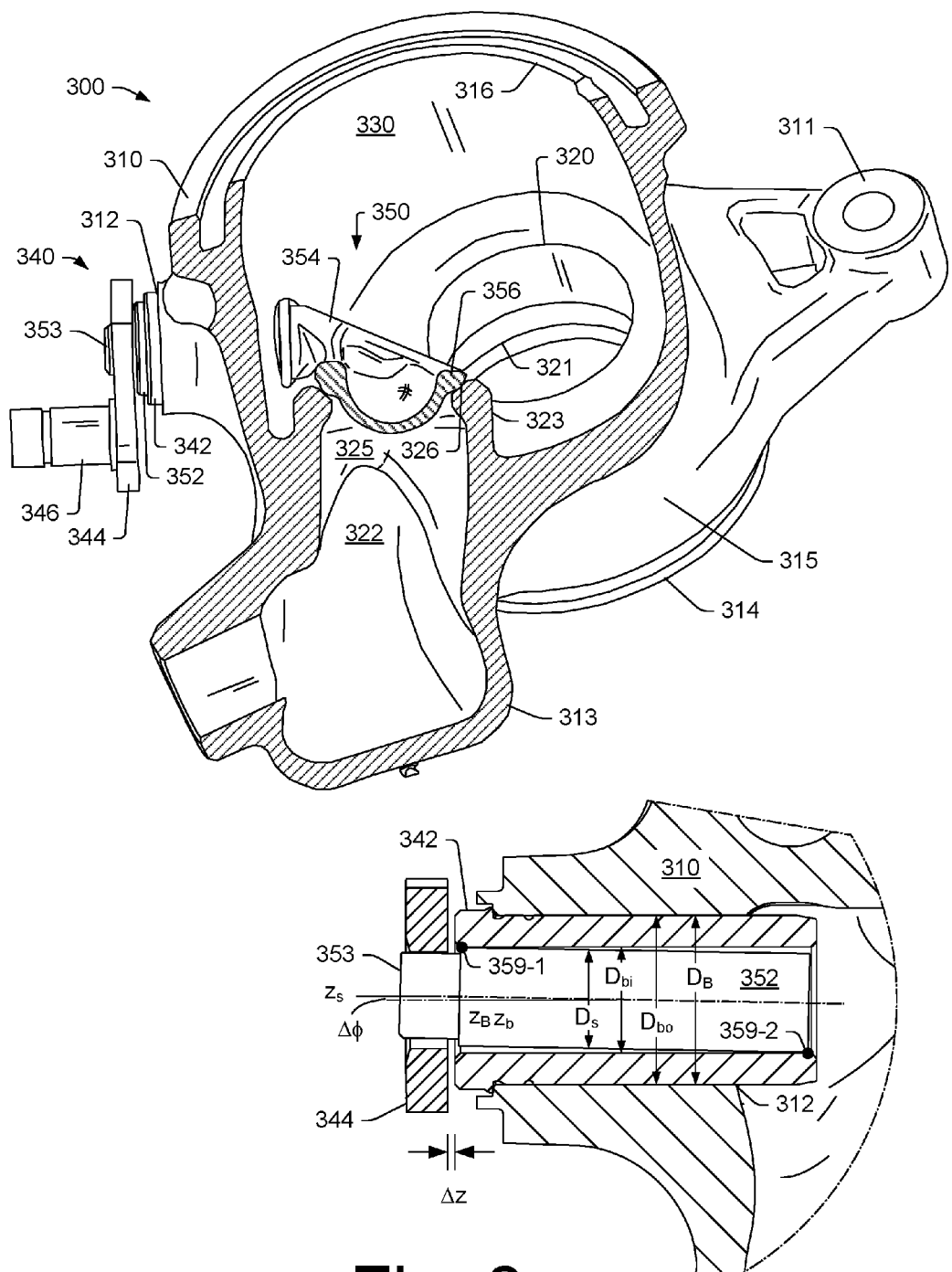
FIG. 3 is a series of views of an example of an assembly that includes a wastegate.

FIG. 3 shows an example of an assembly 300 that includes a wastegate arm and plug 350 that differs from the wastegate arm and plug 250 of the assembly 200 of FIG. 2. In particular, the wastegate arm and plug 350 includes a plug 356 that includes a substantially hemispherical shell portion 357.

In the example of FIG. 3 the assembly 300 includes a turbine housing 310 that includes a mounting flange 311, a bore 312, an inlet conduit 313, a turbine wheel opening 314, a spiral wall 315, an exhaust outlet opening 316, a shroud wall 320, a nozzle 321, a volute 322 formed in part by the spiral wall 315, a wastegate wall 323 that defines (e.g., at least in part) a wastegate passage 325 where the wastegate wall 323 extends to a wastegate seat 326 that may be an interface between the wastegate passage 325 and an exhaust chamber 330.

In the example of FIG. 3, the turbine housing 310 may be a single piece or multi-piece housing. As an example, the turbine housing 310 may be a cast component (e.g., formed via sand casting or other casting process). The turbine housing 310 includes various walls, which can define features such as the bore 312, the turbine wheel opening 314, the exhaust outlet opening 316, the chamber 330, etc. In particular, the wastegate wall 323 defines at least in part the wastegate passage 325, which is in fluid communication with the inlet conduit 313 where a wastegate control linkage 340 and the wastegate arm and plug 350 are configured for opening and closing the wastegate passage (e.g., for wastegating exhaust).

As an example, the assembly 300 may be fitted to an exhaust conduit or other component of an internal combustion engine (see, e.g., examples of FIG. 1), for example, via a flange (see, e.g., the flange 211 of FIG. 2) such that exhaust is received via the inlet conduit 313, directed to the volute 322. From the volute 322, exhaust is directed via the nozzle 321 to a turbine wheel disposed in the turbine housing 310 via the opening 314 to flow and expand in a turbine wheel space defined in part by the shroud wall 320. Exhaust can then exit the turbine wheel space by flowing to the chamber 330 and then out of the turbine housing 310 via the exhaust outlet opening 316. As to wastegating, upon actuation of the control linkage 340 (e.g., by an actuator coupled to the peg 346), the wastegate arm and plug 350 may be rotated such that at least a portion of the received exhaust can flow in the wastegate passage 325 (e.g., as defined at least in part by the wastegate wall 323), past the wastegate seat 326 and into the chamber 330, rather than through the nozzle 321 to the turbine wheel space. The wastegated portion of the exhaust may then exit the turbine housing 310 via the exhaust outlet opening 316 (e.g., and pass to an exhaust system of a vehicle, be recirculated in part, etc.).

In the example of FIG. 3, the wastegate control linkage 340 includes a bushing 342 configured for receipt by the bore 312 of the turbine housing 310, a control arm 344 and a peg 346 and the wastegate arm and plug 350 includes a shaft 352, a shaft end 353, an arm 354 and the plug 356. As shown, the bushing 342 is disposed between the bore 312 and the shaft 352, for example, to support rotation of the shaft 352, to seal the chamber 330 from an exterior space, etc. The bore 312, the bushing 342 and the shaft 352 may each be defined by a diameter or diameters as well as one or more lengths. For example, the shaft 352 includes a diameter $D_s$, the bore 312 includes a diameter $D_B$ while the bushing 342 includes an inner diameter $D_{bi}$ and an outer diameter $D_{bo}$. In the example of FIG. 3, when the various components are assembled, the diameters may be as follows: $D_B > D_{bo} > D_{bi} > D_s$. As to lengths, a length of the shaft 352 exceeds a length of the bushing 342, which exceeds a length of the bore 312. Such lengths may be defined with respect to a shaft axis $z_s$, a bushing axis $z_b$ and a bore axis $z_B$.

In an enlarged cutaway view, the shaft 352 is shown as including an axis $z_s$ that may become misaligned with an axis $z_b$ of the bushing 342. For example, the bushing 342 may be received with minimal radial clearance with respect to the bore 312 of the housing 310 while a radial clearance may exist (e.g., a larger radial clearance) between the shaft 352 and an inner surface of the bushing 342. In such a manner, the shaft 352 may tilt with respect to the axis of the bushing 342 and, for example, the axis of the bore 312. In the example of FIG. 3, contact points 359-1 and 359-2 are shown, which may determine a maximal extent of misalignment with respect to tilting of the axis of the shaft 352 with respect to the axis of the bushing 342. As an example, such tilt may be represented by a tilt angle $\Delta\varphi$.

The enlarged cutaway view of FIG. 3 also shows an axial gap $\Delta z$ that exists between an outwardly facing end of the bushing 342 disposed at an axial position and an inwardly facing surface of the control arm 344 disposed at an axial position. In such an example, the axial gap may be defined by the difference between these two axial positions. As shown in the example of FIG. 3, the shaft 352 may be able to move axially where the axial distance may be limited in part by the end of the bushing 342, which defines, in part, the axial gap $\Delta z$. For example, the inwardly facing surface of the control arm 344 may contact the end of the bushing 342, which, in turn, may limit axial inward movement of the shaft 352.

As illustrated in the example of FIG. 3, the shaft 352 may tilt and may move axially where such movements may be limited (see, e.g., $\Delta z$ and $\Delta\varphi$). As an example, the wastegate arm and plug 350 may act to self-center with respect to the wastegate seat 326 responsive to force applied to the control arm 344 (e.g., which is transmitted to the wastegate arm and plug 350 via the shaft 352). In such an example, self-centering may occur for effective sealing of the wastegate within the range of clearances that allow for axial and/or angular movement of the shaft 352.

As an example, during operational use, one or more clearances between various components (e.g., plug, arm, shaft, bore, bushing, etc.) may change. Forces that can cause such change include aerodynamic excitation, high temperatures, temperature cycling (e.g., temperatures<−20 degrees C. to >1000 degrees C.), chemical attack, friction, deterioration of materials, etc. For at least the foregoing reasons, it may be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As mentioned, the wastegate arm and plug 350 differs from the wastegate arm and plug 250. In particular, the plug 356 differs from the plug 256. Further, the shape of the arm 354 differs from the shape of the arm 254. In an assembly such as the assembly 200 or the assembly 300, due to one or more factors, the wastegate arm and plug 350 may enhance performance, controllability, longevity, etc. when compared to the wastegate arm and plug 250.

As an example, the wastegate arm and plug 350 may be shaped with respect to the wastegate seat 326 to provide for effective sealing within amounts of known machined and assembled clearances and, for example, within amounts of additional clearances that may occur responsive to wear, temperature, etc.

As an example, the wastegate arm and plug 350 may be a unitary wastegate arm and plug (e.g., a monoblock wastegate arm and plug) or a wastegate arm and plug assembly. In contrast, a multicomponent arm and plug assembly includes interfaces between components. Such interfaces may be subject to wear, deformation, etc., which may interfere with proper operation over time.

As an example, the wastegate arm and plug 350 may have a lesser mass than the wastegate arm and plug 250 and, for example, a center of mass for the wastegate arm and plug 350 may differ compared to a center of mass for the wastegate arm and plug 250. As an example, due to the shape of the plug 356, it may perform aerodynamically in a more beneficial manner than the plug 256. For example, the plug 356 may, due to its shape, act to maintain its center more effectively than the plug 256. As an example, the wastegate arm and plug 350 may provide benefits as to controllability, for example, due to centering, reduces chatter, aerodynamics, etc. As an example, such benefits may improve performance, longevity, etc. of an actuator that is operatively coupled to the wastegate arm and plug 350 (e.g., for transitioning states, maintaining a state, etc.). As an example, such benefits may improve performance, longevity, etc. of a seal mechanism (e.g., bushing, bushings, etc.) for the shaft 352 of the wastegate arm and plug 350 (e.g., with respect to a bore).

Figure 4:
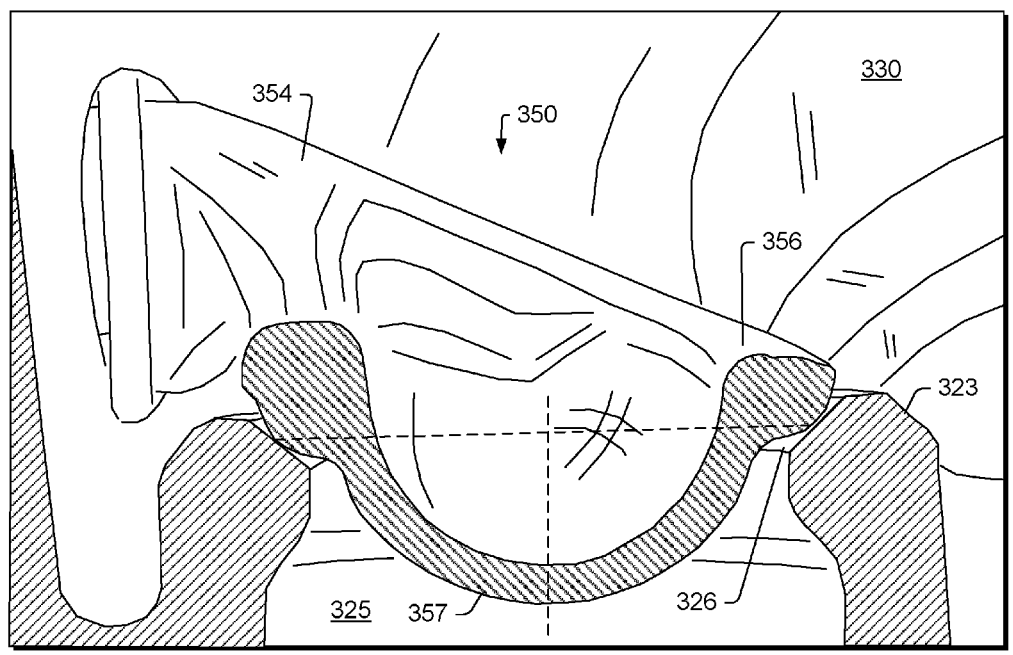
FIG. 4 is a cutaway view of the wastegate of FIG. 3.

FIG. 4 shows an enlarged view of a portion of the assembly 300 of FIG. 3. As shown in the example of FIG. 4, the plug 356 includes a substantially hemispherical shell portion 357. As an example, a spherical shell may be defined as a generalization of an annulus to three dimensions. As an example, a spherical shell may be defined as a region between two concentric spheres of differing radii. As an example, a hemispherical shell may be defined as a region between two hemispheres of differing radii. As an example, a substantially hemispherical shell may include a portion that may be defined by a portion of a first hemisphere and a portion of a second hemisphere.

As an example, a substantially hemispherical shell may have a center of mass (e.g., geometric centroid) that may be approximated as lying at a distance d along an axis from a base plane where the distance may be defined by a first radius r1 and a second radius r2. For example, the distance d may be defined as $3(r2^4-r1^4)/8(r2^3-r1^3)$. In comparison, the center of mass (e.g., geometric centroid) of a uniform solid hemisphere of radius r lies on the axis of symmetry at a distance of $3r/8$ from the base. As to volume, the volume of a solid hemisphere is $2/3\pi r^3$ and the volume of a hemispherical shell may be calculated by subtracting the volume of two hemispheres. As an example, a solid hemisphere with a radius of 1 cm may have a center of mass at about 0.375 cm from a base plane and a volume of about 2.1 cubic centimeters and a hemispherical shell with an outer radius of 1 cm and an inner radius of 0.8 cm may have a center of mass at about 0.45 cm from a base plane and a volume of about 1 cubic centimeter. Thus, in such an example, while the center of mass may be extended for the hemispherical shell with respect to the solid hemisphere, the overall mass is about one half that of the solid hemisphere. In such an example, where a plug is fashioned as a hemispherical shell rather than a solid hemisphere, the reduction in overall mass may be beneficial as to performance, controllability, etc. (e.g., the reduction in mass may overcome any detriment from a slight increase in center of mass away from a base plane, which may include an axis of rotation of a shaft).

Figure 5:
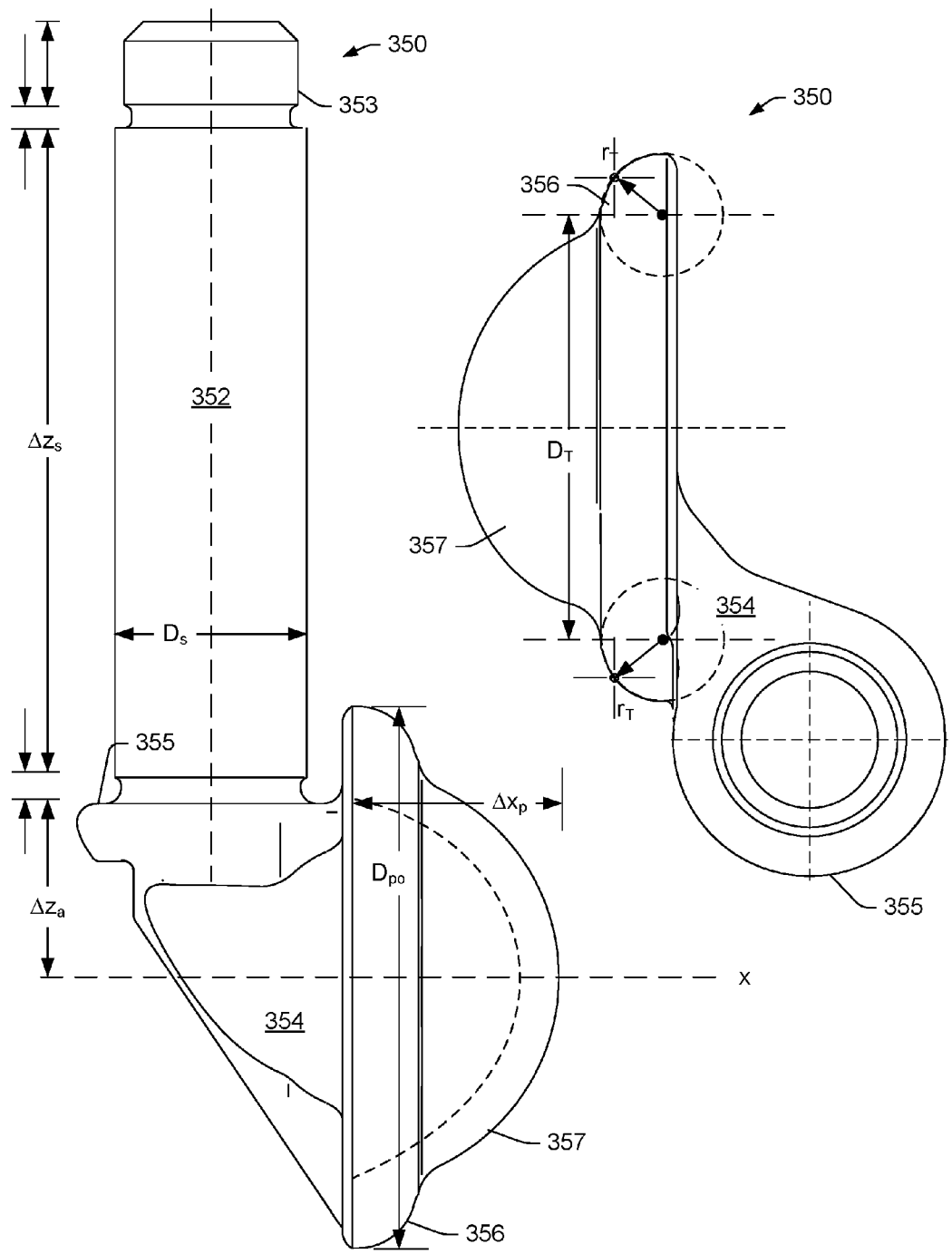
FIG. 5 is a series of views of an example of a wastegate.

FIG. 5 shows an example of the wastegate arm and plug 350 that may be included in an assembly (e.g., an assembly that includes multiple wastegate passages, a bridge or divider across a wastegate passage, etc.). As an example, the wastegate arm and plug 350 may be made of material (e.g., metal, alloy, etc.) suitable for temperatures experienced during operation of an exhaust turbine (e.g., of a turbocharger).

In the example of FIG. 5, the wastegate arm and plug 350 includes the shaft 352 that includes a diameter $D_s$ over a length $\Delta z_s$, the arm 354 that extends axially outwardly away from the shaft 352 from a shoulder 355 and radially downwardly to the plug 356, which includes the substantially hemispherical shell portion 357. An axial dimension $\Delta z_a$ is shown in the example of FIG. 5 as being a distance from the shoulder 355 to a centerline of the plug 356. The plug 356 is shown as having an outer diameter $D_{po}$. As an example, the centerline of the plug 356 may define or coincide with an x-axis that may, for example, be used as a reference to describe features of the arm 354, the plug 356, angles of rotation of the arm 354 and the plug 356, etc.

Figure 6:
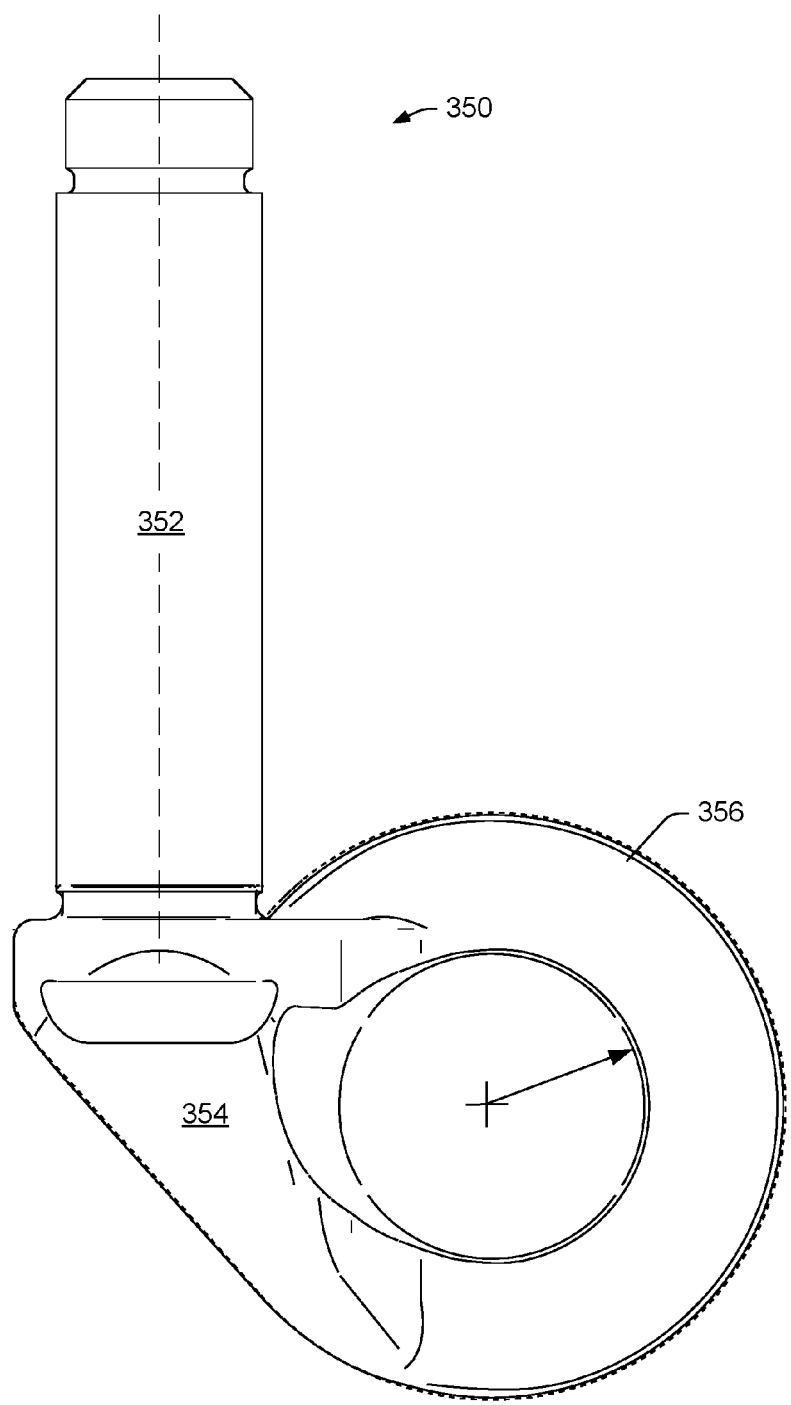
FIG. 6 is a view of the wastegate of FIG. 5.

FIG. 6 shows a top plan view of the wastegate arm and plug 350 of FIG. 5. As shown, a surface of the plug 356 may be defined in part by an inner radius or radii, for example, as measured from an axis (see also dashed line in FIG. 5). Such a surface may define, in part, a shell such as, for example, a spherical cap shell, a substantially hemispherical shell, etc.

Figure 7:
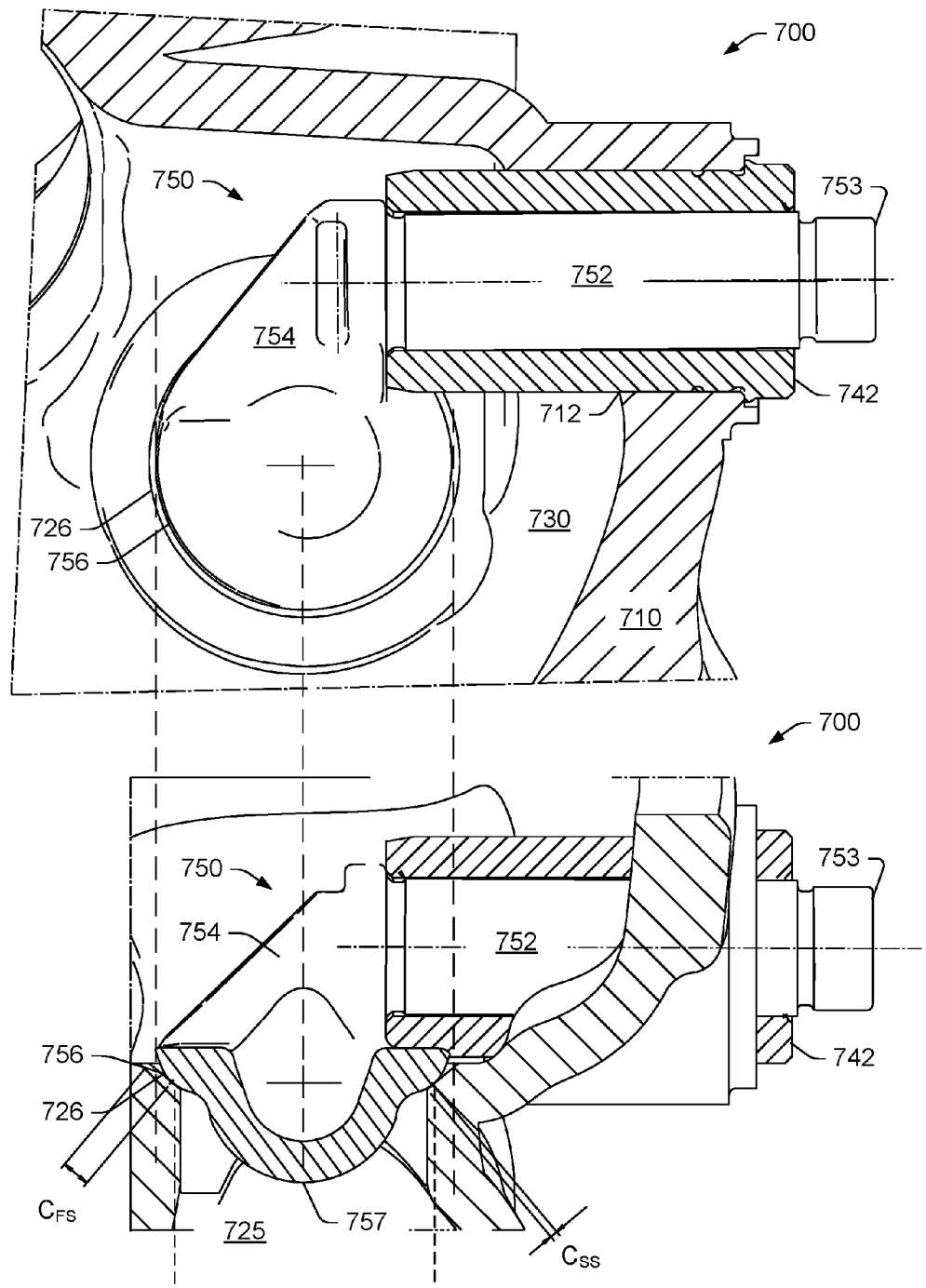
FIG. 7 is a series of cutaway views of an example of an assembly that includes a wastegate.

FIG. 7 shows a portion of an example of an assembly 700 that includes a turbine housing 710 that includes a bore 712, a wastegate passage 725, a wastegate seat 726, a chamber 730 and a wastegate arm and plug 750. As shown in FIG. 7, the wastegate arm and plug 750 includes a shaft 752, a shaft end 753, an arm 754 that extends from the shaft 752, a plug end 755, a plug 756 that extends from the arm 754 and a substantially hemispherical shell portion 757 that extends from the plug 756.

In the example of FIG. 7, contact regions are indicated with respect to a shaft side and a free side (see, e.g., $C_{SS}$ and $C_{FS}$). As shown, the plug 756 contacts the wastegate seat 726 at a distance below an upper edge of the wastegate seat 726 (see, e.g., $C_{FS}$) and contacts the wastegate seat 726 at a distance above a lower edge of the wastegate seat 726 (see, e.g., $C_{SS}$). As an example, a surface of contact may be defined with respect to the wastegate seat 726 and a surface of contact may be defined with respect to the plug 756.

As an example, force applied to the wastegate arm and plug 750 may overcome exhaust pressure in the passage 725 (e.g., a pressure differential between the passage 725 and the chamber 730) and such force may cause the plug 756 to self-center with respect to the wastegate seat 726 to provide an effective seal (e.g., minimal leakage of exhaust from the passage 725 to the chamber 730). As mentioned, clearances may exist that allow for some movement of the shaft 752 with respect to the bushing 742 and, for example, the bore 712. As an example, the plug 756 and the wastegate seat 726 may be shaped to provide for effective sealing via some amount of self-centering of the plug 756, for example, within clearance(s) that may exist that allow for movement of the shaft 752. In other words, clearances may exist that allow for shaft movement that allows for self-centering of a plug with respect to a wastegate seat (e.g., for purposes of achieving effective sealing).

Figure 8:
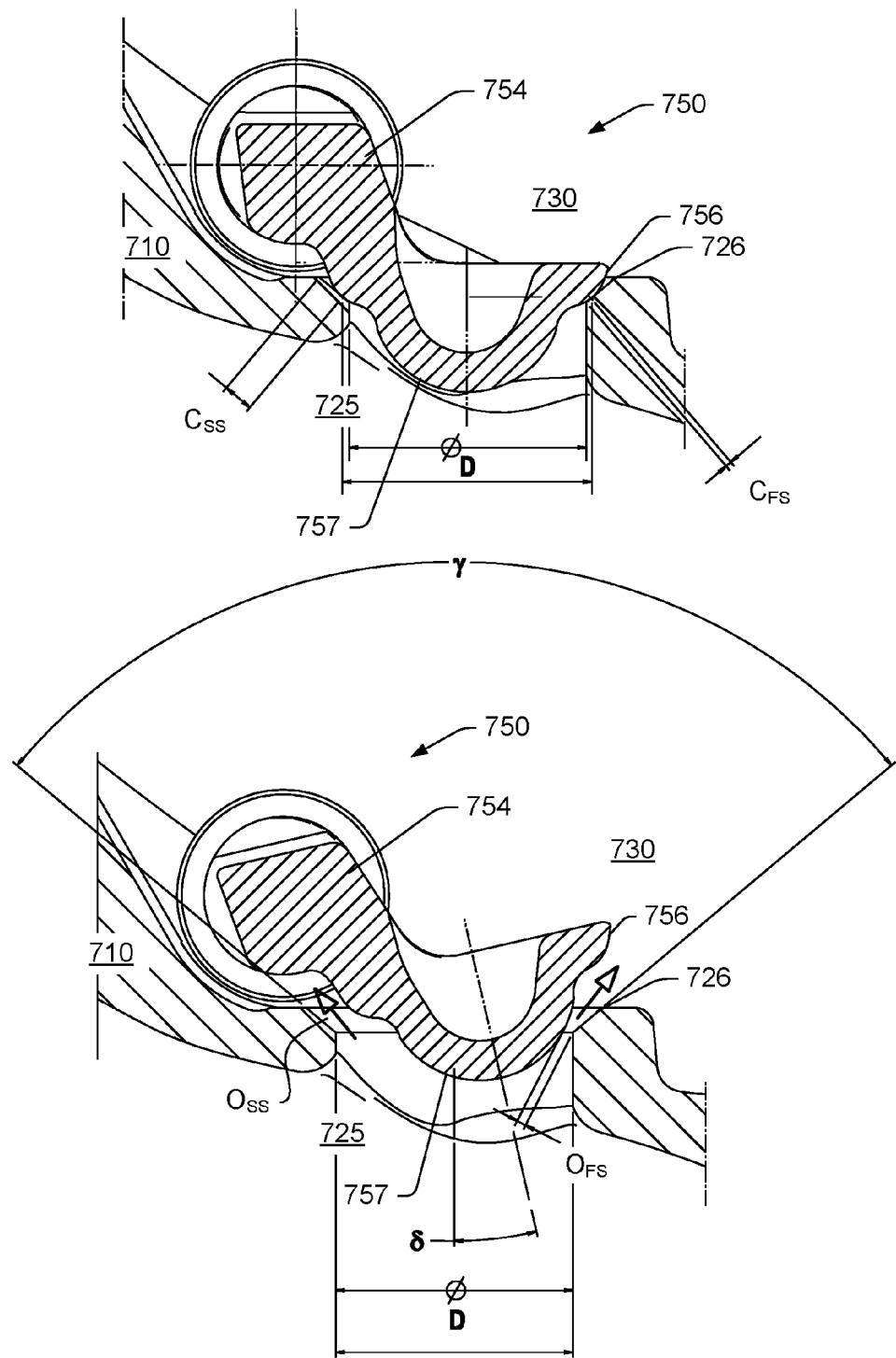
FIG. 8 is a series of cutaway views of the example assembly of FIG. 7.

FIG. 8 shows cutaway views of the assembly 700 of FIG. 7 for the plug 756 in a closed position and in an open position with respect to the wastegate seat 726. Such views illustrate how a flow passage (e.g., opening between the passage 725 and the chamber 730) may be shaped by the substantially hemispherical shell portion 757 of the wastegate arm and plug 750.

FIG. 8 also shows various examples of dimensions. For example, the wastegate seat 726 may be defined in part by a cone angle ($\gamma$). As an example, a relationship between the wastegate seat 726 and the substantially hemispherical shell portion 757 may be defined by an opening angle ($\delta$).

In the example of FIG. 8, open regions are indicated with respect to a shaft side and a free side (see, e.g., $O_{SS}$ and $O_{FS}$). These regions exist in three-dimensions, for example, as an annulus with a shape that depends on angle about a central axis of the wastegate seat 726. As shown in the example of FIG. 8, exhaust may flow via these open regions (see, e.g., open-headed arrows).

Figure 9:
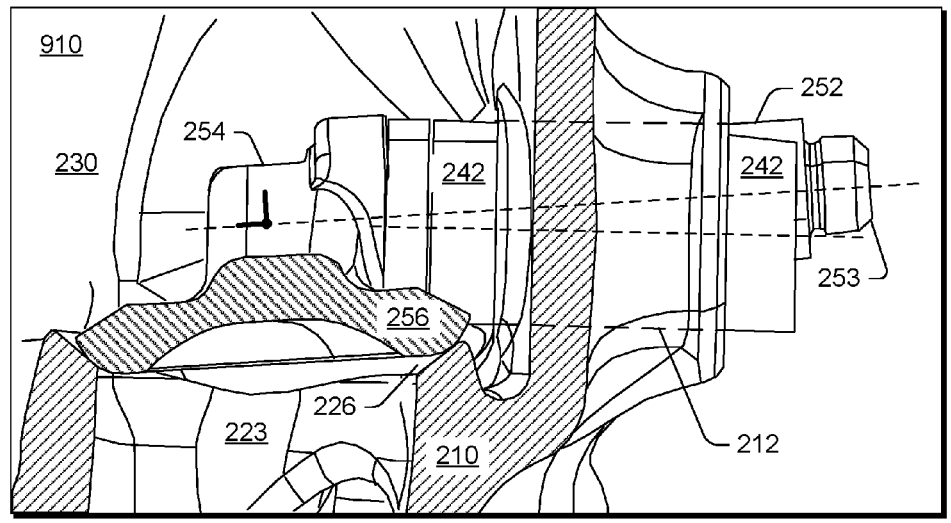
FIG. 9 is a series of cutaway views of a wastegate arm and plug in two different orientations.
Figure 9:
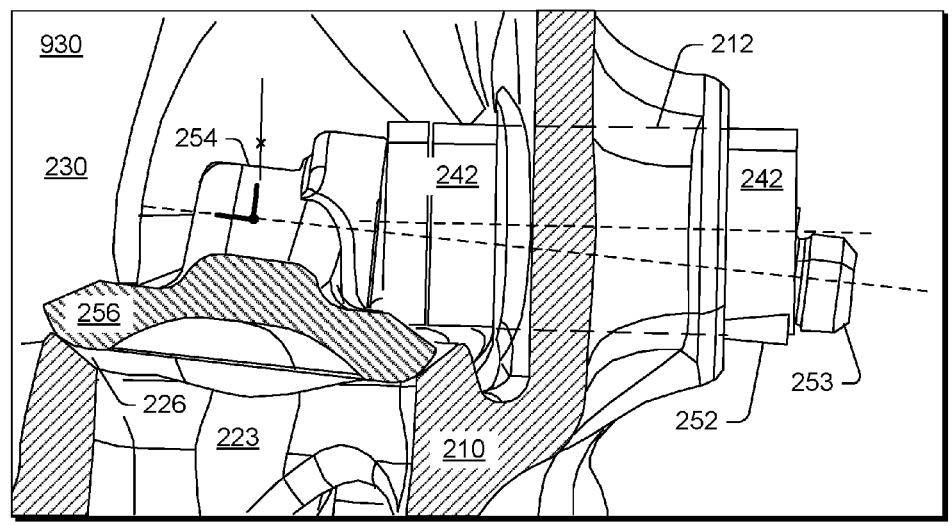
Figure 10:
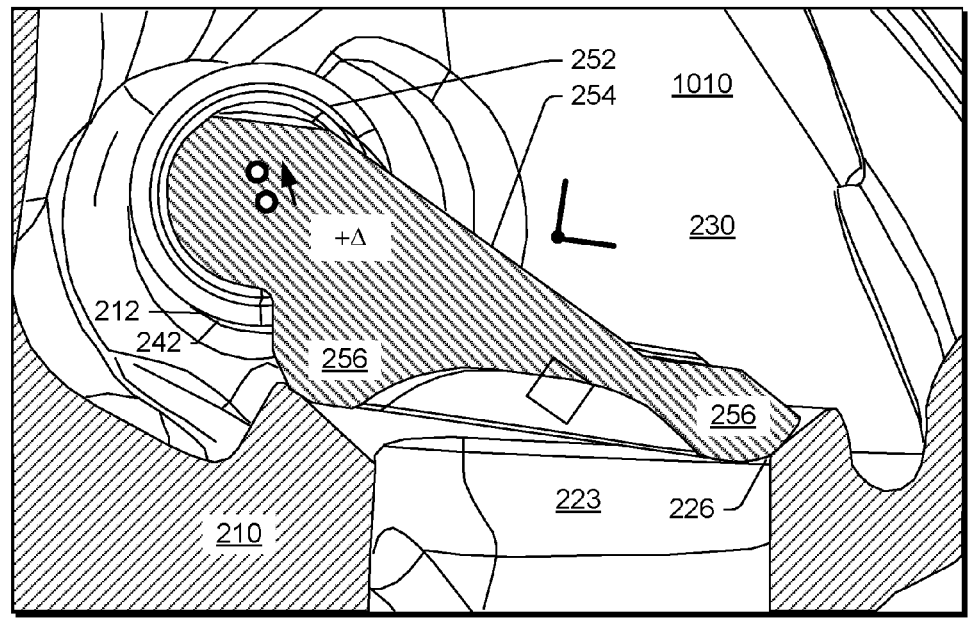
FIG. 10 is a series of cutaway views of a wastegate arm and plug in two different orientations.
Figure 10:
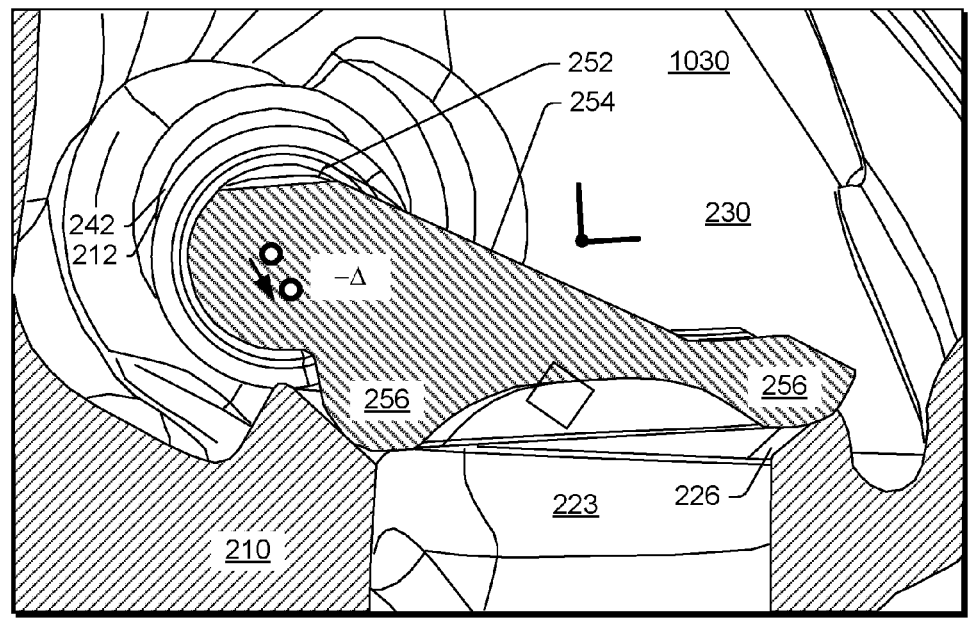

FIGS. 9 and 10 shows some additional examples of clearances and possible movements for the wastegate arm and plug 250, noting that such movements may optionally occur for one or more other arrangements described herein (e.g., depending on clearances, etc.).

FIG. 9 shows two displaced orientations 910 and 930 of the wastegate arm and plug 250 within the assembly 200, in particular, where the axis of the shaft 252 of the wastegate arm and plug 250 is not aligned with, for example, the axis of the bore 212 (e.g., and the axis of the bushing 242 disposed in the bore 212).

In the orientations 910 and 930, contact exists between the plug 256 and the wastegate seat 226. In particular, contact exists between a radiused portion (e.g., toroidal portion) of the plug 256 and a conical portion of the wastegate seat 226. As an example, the orientations 910 and 930 may represent maximum angular misalignments with respect to a bore axis of a bore (e.g., ±5 degrees), for example, where some angular misalignment with respect to a bushing axis of a bushing disposed in the bore (e.g., ±1 degree). As mentioned, for a variety of reasons, some misalignment may occur (e.g., during assembly, during operation, etc.). For example, FIG. 3 shows a tilt angle ($\Delta\varphi$) for the shaft 352 with respect to the bushing 342 and, for example, the bore 312.

FIG. 10 shows two displaced orientations 1010 and 1030 of the wastegate arm and plug 250 within the assembly 200, in particular, where the axis of the shaft 252 of the wastegate arm and plug 250 is not aligned with, for example, the axis of the bore 212 (e.g., and the axis of the bushing 242 disposed in the bore 212).

In the orientations 1010 and 1030, contact exists between the plug 256 and the wastegate seat 226. In particular, contact exists between a radiused portion (e.g., toroidal portion) of the plug 256 and a conical portion of the wastegate seat 226. As an example, the orientations 1010 and 1030 may represent maximum displacement misalignments (e.g., $\Delta$) with respect to a bore axis of a bore (e.g., ±1.6 mm), for example, where some displacement misalignment with respect to a bushing axis of a bushing disposed in the bore (e.g., ±0.1 mm). As mentioned, for a variety of reasons, some misalignment may occur (e.g., during assembly, during operation, etc.). For example, FIG. 3 shows a tilt angle ($\Delta\varphi$) for the shaft 352 with respect to the bushing 342 and, for example, the bore 312.

As an example, a wastegate arm and plug may include extreme positions inside a bushing disposed in a bore of a turbine housing while being able to maintain contact with a wastegate seat for purposes of sealing a wastegate passage (e.g., adequate sealing for acceptable performance). For example, the toroidal portion of the plug 356 (e.g., or the plug 756) may act to maintain contact with a wastegate seat.

Figure 11:
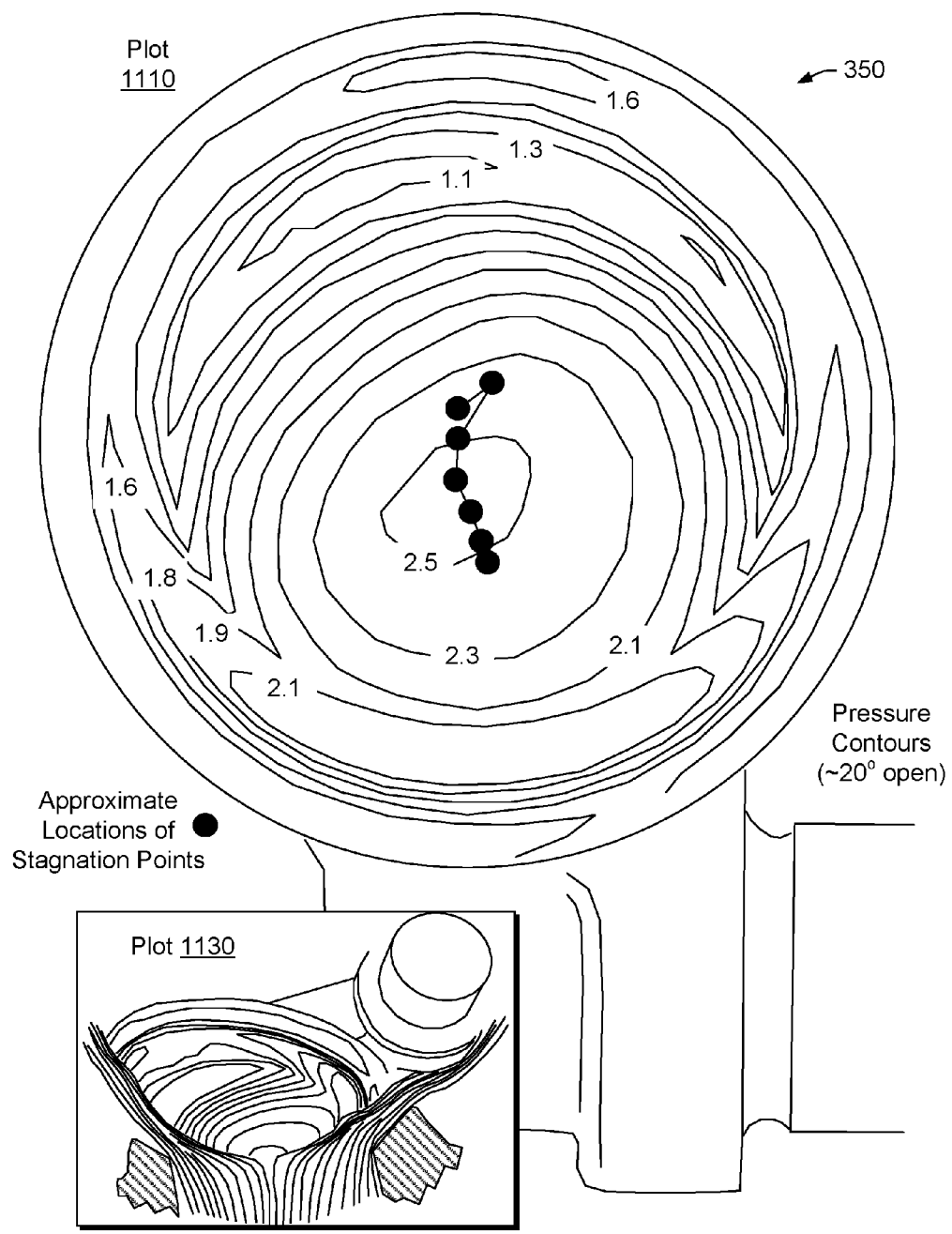
FIG. 11 is a series of diagrams of an example of a wastegate with respect to fluid flow.

FIG. 11 shows examples of plots 1110 and 1130 of trial data for a wastegate arm and plug in an assembly. As shown in FIG. 11, the plot 1110 is a pressure contour plot for an open angle of about 20 degrees. In the plot 1110, a series of filled circles approximate locations of points (e.g., stagnation points or pressure maxima) over a range of angles from about 2.5 degrees open to about 30 degrees open (e.g., without correction of perspective of the plug). The plot 1130 shows flow streamlines as well as pressure contours, for example, to illustrate how exhaust flows through a plug-seat clearance for an open angle of about 20 degrees. As mentioned, a high pressure may correspond to a stagnation point about which flow is diverted radially outwardly to flow through a plug-seat clearance. As mentioned, for at least some open angles, both a toroidal portion of a plug and a modified sphere portion of a plug may define a plug-seat clearance. As open angle changes, the shape of the plug-seat clearance also changes. As illustrated in the example of FIG. 11, the locations of pressure maxima experienced by a plug over a range of open angles may be "controlled" at least in part by shape of the plug and, for example, at least in part by shape of a wastegate seat.

As an example, in fluid dynamics, a stagnation point may be a point in a flow field where local velocity of fluid is approximately zero. A stagnation point may exist at a surface of an object in a flow field, for example, where fluid is brought to rest by presence of the object in the flow field (e.g., consider a bluff body in a flow field). As an example, the Bernoulli equation may demonstrate how static pressure is highest where velocity is zero (e.g., such that static pressure or "stagnation pressure" may be at its maximum value at a stagnation point). Where the object is movable in a flow field via an actuator, the pressure experienced by the object may be transmitted to the actuator. If a movable object "catches" wind while being moved by an actuator (e.g., a sharp transition such as a step transition in pressure), the actuator may be impacted as well. As an example, the shape of the plug 356 may help reduce impact on an actuator as the actuator rotates the plug 356 with respect to a wastegate opening that provide for flow of exhaust.

As an example, the plug 356 (e.g., or the plug 756) may be configured with two plug portions, for example, that extend from a lower surface of the plug 356 (e.g., consider a cutting plane that cuts the plug 356 to form a plane from which two plug portions extend downwardly therefrom). As an example, such plug portions may act to seal multiple exhaust passages (e.g., multiple wastegate passages) while plug portions (e.g., extensions) may extend into such passages to form clearances to direct exhaust flow (e.g., such plug portions may be configured to not contact a turbine housing, a wastegate passage wall, etc.).

For example, in FIG. 5, the plug 356 may including two plug portions extending axially outward in a direction of the x-axis (e.g., a distance $\Delta x_p$), for example, from a toroidal portion of the plug 356 defined at least in part by a radius $r_T$ where, for example, a perimeter of the plug portions is less than a circumference having a diameter $D_T$ associated with the toroidal portion of the plug 356 (e.g., in a projected view, the perimeter may be within the circumference). As an example, a plug may include a first plug portion shaped approximately as a quarter of a sphere and a second plug portion shaped approximately as a quarter of a sphere.

As an example, a plug may include two plug portions with a spacing between the two plug portions that may be, for example, oriented orthogonally to a shaft of a wastegate arm and plug. In such an example, rotation of the wastegate arm and plug about a rotational axis of the shaft can ensure alignment of the spacing with respect to a divider that divides two openings into which the two plug portions may extend. Receipt of the plug portions by two openings can allow a toroidal portion of a plug (see, e.g., the plug 356) to seat in a single seat that serves as part of a sealing mechanism for the two openings.

As an example, plug portions may enhance operational dynamics (e.g., fluid dynamics) associated with two openings while another portion of a plug that acts to seal both openings (e.g., via a common valve seat).

As an example, a plug portion may include a spherical wedge shape that includes a spherical lune surface. A spherical lune is a portion of a surface of a sphere of radius r cut out by two planes through the azimuthal axis with a dihedral angle. As an example, a dihedral angle of a plug portion may be in a range from about 45 degrees to about 90 degrees. As an example, a plug may include symmetric plug portions where each plug portion may be defined by a dihedral angle (e.g., +90 degrees and −90 degrees). As an example, two plug portions may be spaced from each other, for example, to accommodate a divider therebetween, which may be a wall that divides two passages.

As an example, a plug portion may be shaped as a modified spherical lune. For example, a modified spherical lune may be a wedge of a spherical cap, a wedge of a modified spherical cap, or a modified wedge of a spherical cap. For example, a plug may be defined as having a shape like a spherical cap with a cut-out portion that forms two spaced apart wedges where the spacing between the wedges can accommodate a divider.

Figure 12:
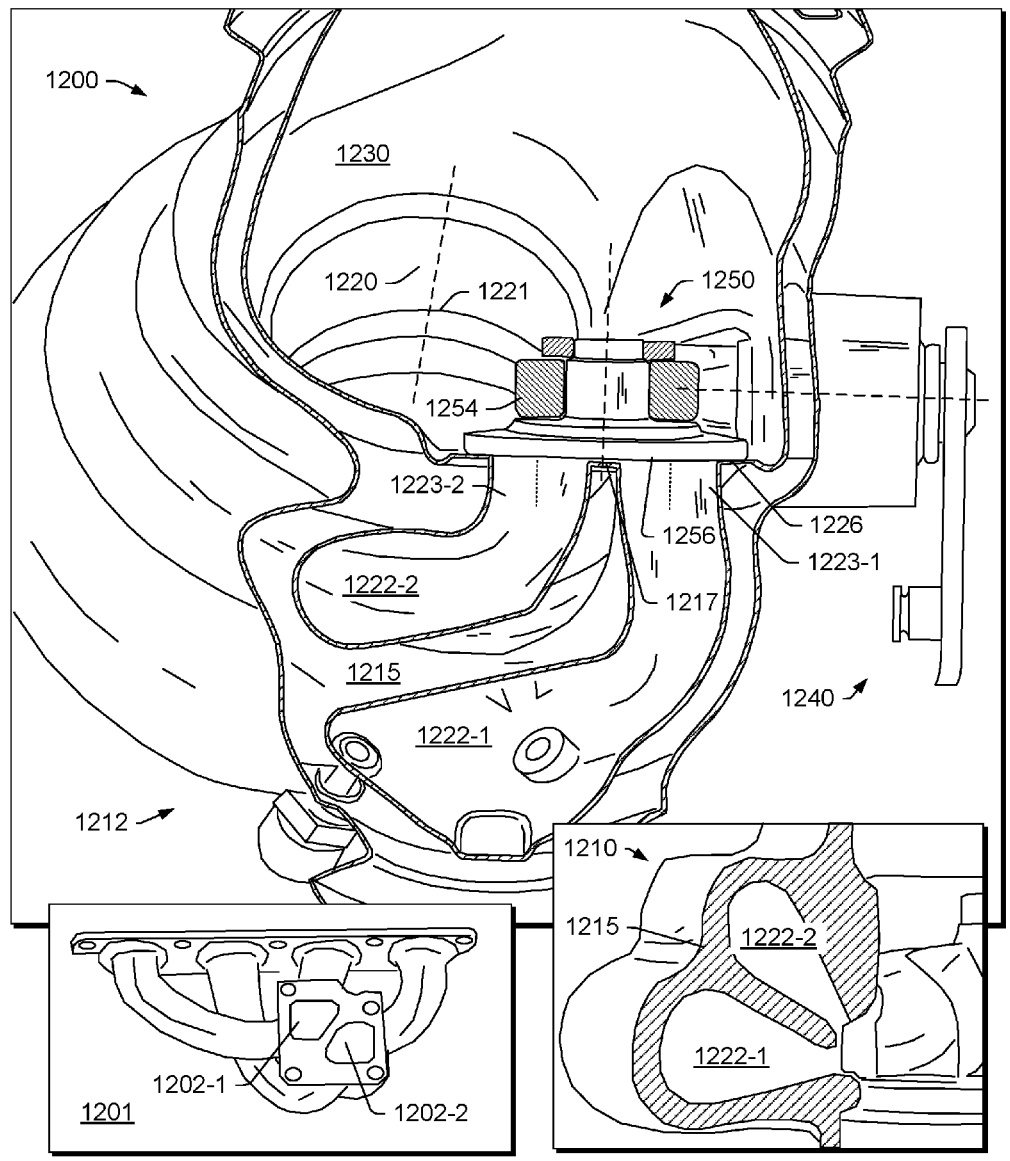
FIG. 12 is a series of views of an example of an assembly that includes two scrolls.

FIG. 12 shows an example of a twin scroll turbine assembly 1200 that may be configured to receive exhaust from a manifold 1201 that includes a two separate exhaust passages, each with its own opening 1202-1 and 1202-2. The assembly 1200 includes a housing 1210 that includes a wall 1215 that defines two scrolls 1222-1 and 1222-2 (e.g., two volutes) that can direct exhaust to a turbine wheel space, for example, via a nozzle or nozzles 1221. As an example, a turbine wheel space may be defined in part by a shroud wall 1220 located axially above the nozzle or nozzles 1221 that extends axially to an exhaust chamber 1030.

In the example of FIG. 12, the housing 1210 includes two wastegate walls 1223-1 and 1223-2 associated with respective scrolls 1222-1 and 1222-2. The two wastegate walls 1023-1 and 1023-2 form openings about which exists a wastegate seat 1226. As shown, the wastegate wall 1223-1 defines a first wastegate passage in fluid communication with a first inlet conduit and the wastegate wall 1223-2 defines a second wastegate passage in fluid communication with a second inlet conduit where, for example, the inlet conduits may be operatively coupled to respective openings 1202-1 and 1202-2 of the manifold 1201. As an example, the manifold 176 of FIG. 1 may be configured to be a divided manifold, for example, where the turbine housing assembly 172 may include twin scrolls (e.g., two volutes). As an example, the cylinder head 154 of FIG. 1 may include divided passages, for example, where the turbine housing assembly 152 may include twin scrolls (e.g., two volutes).

For control of exhaust flow through the wastegate passages, the assembly 1200 includes a wastegate control linkage 1240 and a wastegate arm and plug 1250 with an arm component 1254 and a plug component 1256 that are configured for opening and closing the wastegate passages (e.g., for wastegating exhaust) via seating of the plug component 1256 with respect to the wastegate seat 1026.

The assembly 1200 may be described, for example, with respect to various axes. For example, consider an axis of a turbine wheel space that may coincide with a rotational axis of a turbine wheel, an axis of a shaft of the wastegate arm and plug 1250 and an axis of the plug component 1256. Further, each of the openings of the wastegate passages may be defined by a respective axis, for example, where in a closed state of the wastegate, the axis of the plug component 1056 is approximately aligned parallel to the axes of the openings of the wastegate passages.

As an example, the manifold 1201 may be considered a divided manifold that separates flow of exhaust from cylinders whose cycles may interfere with one another (e.g., as to exhaust pulse energy). For example, on a four-cylinder engine with firing order 1-3-4-2, cylinder #1 is ending its expansion stroke and opening its exhaust valve while cylinder #2 still has its exhaust valve open (cylinder #2 is in its overlap period). In an undivided exhaust manifold, a pressure pulse from cylinder #1's exhaust blowdown event may be more likely to contaminate cylinder #2 with high pressure exhaust gas, which can impact performance of cylinder #2's (e.g., ability to breathe properly) and diminish pulse energy that may have been better utilized in by a turbine. As an example, a proper grouping for the aforementioned engine may keep complementary cylinders grouped together (e.g., exhaust of cylinders #1 and #4 as one complementary group and cylinders #2 and #3 as another complementary group).

Such an approach may better utilize exhaust pulse energy and, for example, improve turbine performance (e.g., increase boost more rapidly).

Referring again to the assembly 1200, pulse energy may differ in the two passages 1223-1 and 1223-2 such that one portion of the plug component 1256 experiences different force than another portion of the plug 1256. Such differences may cause vibration, misalignment, wear, etc. For example, as the plug component 1256 includes a stem seated in an opening of the arm component 1254, pressure may cause the plug component 1256 to tilt such that an axis of the stem misaligns with respect to an axis of the opening of the arm component 1254. Over time, wear may occur (e.g., increased clearances), which may exacerbate wear, leakage, etc.

As to leakage, leakage may occur from a passage to the chamber 1030 and/or from one passage to another passage (e.g., and vice versa). For example, due to a pressure difference between the passages, exhaust may flow from the passage formed by the wall 1223-1 to the passage formed by the wall 1223-2 in a space above a divider wall surface 1217 and the plug component 1256. Such flow may act to "equalize" pressures, which may, for example, be detrimental to a divided manifold approach (e.g., or a twin scroll approach). Such flow may be referred to as scroll-to-scroll leakage that occurs for a closed operational state of a wastegate arm and plug (e.g., where a controller, actuator, etc. calls for the passages to be closed).

Figure 13:
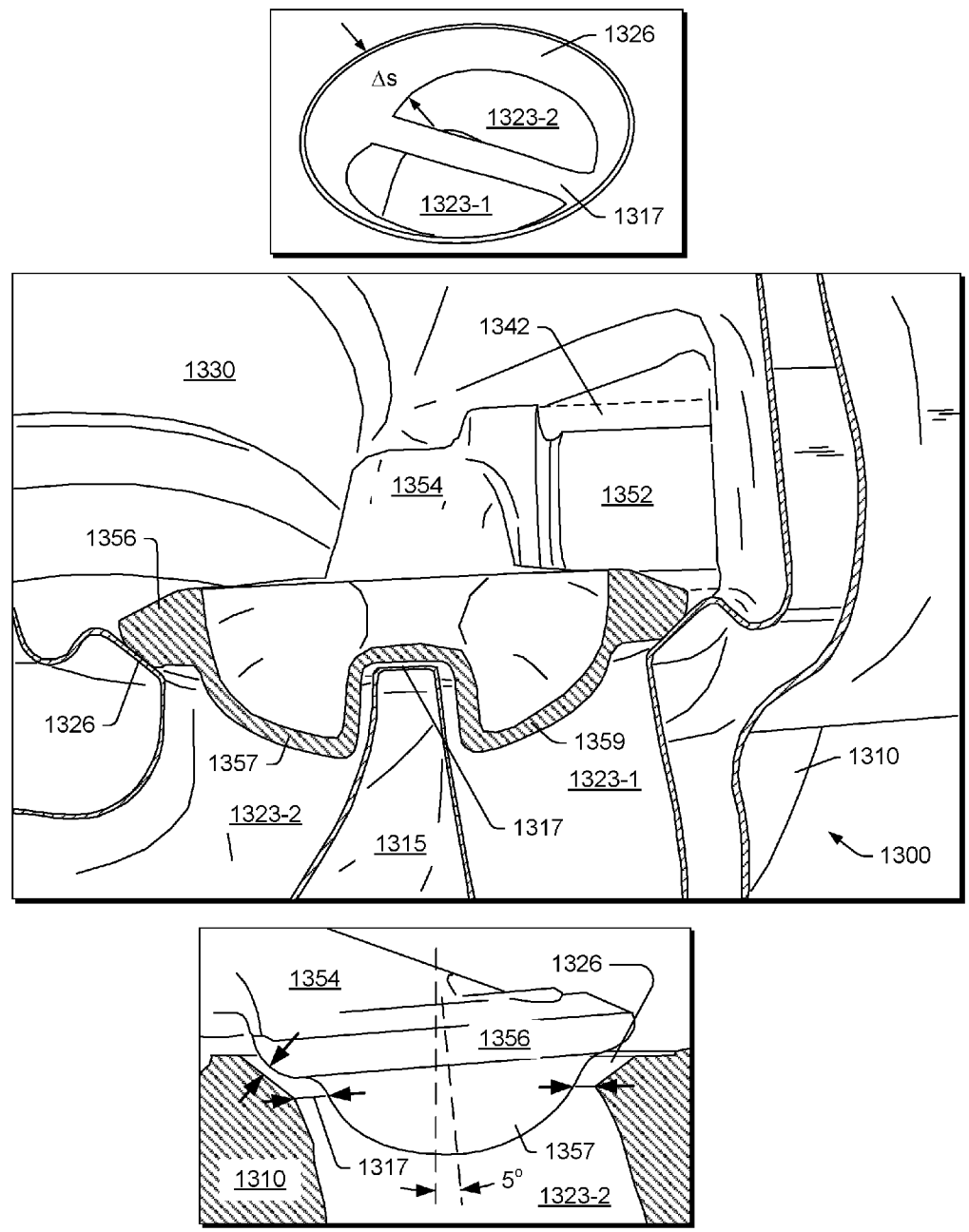
FIG. 13 is a series of views of an example of an assembly that includes two scrolls and an example of wastegate.

FIG. 13 shows two cutaway views of an example of an assembly 1300 that includes a housing 1310 and a wastegate arm and plug 1350 and shows a perspective view of an example of a wastegate seat 1326. As an example, the wastegate arm and plug 1350 in conjunction with the wastegate seat 1326 may provide for a more progressive flow through a wastegate during wastegate valve opening. As an example, the wastegate seat 1326 may be defined in part by a conical surface.

As shown in the example of FIG. 13, the housing 1310 includes a wastegate walls 1323-1 and 1323-2 that extend to the wastegate seat 1326 and includes an exhaust chamber 1330. In the example of FIG. 13, the turbine housing 1310 may be a single piece or multi-piece housing. As an example, the turbine housing 1310 may be a cast component (e.g., formed via sand casting or other casting process). As an example, the housing 1310 may be made of material (e.g., metal, alloy, etc.) suitable for temperatures experienced during operation of an exhaust turbine (e.g., of a turbocharger).

The turbine housing 1310 includes various walls, which can define features such as a bore, a turbine wheel opening, an exhaust outlet opening, etc. In particular, in the example of FIG. 13, the wastegate walls 1323-1 and 1323-2 define wastegate passages in fluid communication with inlet conduits (e.g., associated with a divided manifold) where a wastegate control linkage and a wastegate arm and plug 1350 are configured for opening and closing the wastegate passages (e.g., for wastegating exhaust). As an example, the assembly 1300 may include a bushing 1342 (see, e.g., dashed lines) that may be disposed in the bore of the turbine housing 1310 and that may abut the shoulder 1355 of the wastegate arm and plug 1350 (see, e.g., the bushing 242 of the assembly 200, the bushing 342 of the assembly 300, etc.).

In the perspective view, an example shape for the wastegate seat 1326 is illustrated, for example, where a seat depth (e.g., from the exhaust chamber 1330 to the space defined by the wastegate walls 1323-1 and 1323-2) may be greater on a shaft side (see, e.g., Δs) than on a front side. As shown a divider wall surface 1317 is disposed, for example, at an axial location that is about the level of a lower edge of the conical shaped wastegate seat 1326. As shown in the cutaway view, the two plug portions 1357 and 1359 descend below the divider wall surface 1317 (e.g., of the wall 1315) to form an approximately inverted U-shaped clearance, which may offer resistance to flow of exhaust between passages formed by the walls 1323-1 and 1323-2. Referring again to the assembly 1200 of FIG. 12, a clearance exists between the divider wall surface 1217 and the plug 1256 that does not offer such resistance to flow of exhaust between passages formed by the walls 1223-1 and 1223-2 (e.g., a flow may occur directly across the divider wall surface 1317). As an example, resistance to exhaust flow between such passages may help preserve benefits provided by a divided manifold operatively coupled to a twin scroll turbine housing (e.g., of a turbocharger).

FIG. 13 shows how a toroidal portion and two plug portions 1357 and 1359 of the plug 1356 may be oriented with respect to the wastegate seat 1326, which may be a conical seat. As shown, the toroidal portion of the plug 1356 can seat against the wastegate seat 1126 when the wastegate arm and plug 1350 is in a closed position. Further, in a closed position, a clearance exists about each of the two plug portions 1357 and 1359 (e.g., the two plug portions 1357 and 1359 do not contact the wastegate seat 1326).

As shown in a lower cutaway view, when the wastegate arm and plug 1350 is in an open position of approximately 5 degrees (e.g., about 5 degrees of rotation of the shaft 1352 in a bore of the housing 1310), surfaces of the two plug portions 1357 and 1359 of the plug 1356 define clearances with respect to the wastegate seat 1326 (see, e.g., front side and shaft side arrows). Where a pressure differential exists (e.g., higher pressure on the wastegate wall side 1323-1 and/or 1323-2), exhaust may flow through the clearances where characteristics of such flow is determined, in part, by the surfaces of the two plug portions 1357 and 1359 of the plug 1356 and, in part, by the surface of the wastegate seat 1326. For example, flow may impinge against the surfaces of the two plug portions 1357 and 1359 of the plug 1356, for example, to form a stagnation point on each of the two plug portions 1357 and 1359 about which flow is diverted radially outwardly therefrom and, for example, toward a clearance between the plug 1356 and the wastegate seat 1326.

Further, as shown in the example of FIG. 13, on a shaft side of the plug 1356, the toroidal portion of the plug 1356 also defines a clearance with respect to the wastegate seat 1326 (e.g., where rotation rotates the front side of the plug 1356 a greater arc distance than the shaft side of the plug 1356). Accordingly, in the example of FIG. 13, for the assembly 1300, both the toroidal portion and the two plug portions 1357 and 1359 of the plug 1356 define clearances with respect to the wastegate seat 1326 of the housing 1310. These clearances (e.g., over a range of "open" angles), act to "control" characteristics of exhaust flow. For example, flow characteristics may be controlled by inter-component clearance shapes over a range of open angles in a manner that enhances controllability of a wastegate. As an example, the assembly 1300 may provide for a monotonic and smooth evolution of pressure with respect to wastegate valve opening where such characteristics enhance controllability of the wastegate valve. Such an approach may particularly enhance control where a wastegate valve actuator is a mechanical vacuum actuator (e.g., an actuator to rotate a wastegate arm and plug with respect to a wastegate seat).

As an example, an assembly such as the assembly 1300 may be operatively coupled to a manifold such as the manifold 1201 of FIG. 12 or the manifold 176, which may be a divided manifold. As an example, an assembly such as the assembly 1300 may be operatively coupled to a cylinder head such as the cylinder head 154 of FIG. 1, for example, where passages 156 may be divided (e.g., twin passages) within the cylinder head 154 to direct exhaust from respective cylinders (e.g., complementary group #1 and #4 and complementary group #2 and #3) to the assembly (e.g., to respective scrolls of a twin scroll housing).

As to stagnation points, which may be points of maximum pressure (e.g., force) upon the plug 1356 of the wastegate arm and plug 1350, these may be located relatively centrally during opening of the wastegate. In such an example, forces exerted upon the plug 1356 may be more effectively transferred to the arm 1354 and the shaft 1352, which, in turn, may act to diminish vibration, misalignment, etc.

As an example, the shape of the plug 1356 (e.g., via the two plug portions 1357 and 1359) may help reduce impact on an actuator as the actuator rotates the plug 1356 with respect to a wastegate opening that provide for flow of exhaust.

In the example assembly 1300, the wastegate arm and plug 1350 may include a shoulder that seats at or proximate to a surface of the housing 1310 (e.g., such that the shaft 1352 may not be visible in the views of FIG. 13). As an example, the assembly 1300 may include a bushing (see, e.g., dashed lines of the bushing 1342 in FIG. 11) such as, for example, the bushing 242 of the assembly 200, the bushing 342 of the assembly 300, etc. For example, such a bushing may be disposed in a bore of a housing and extend to the shoulder 1355 of the wastegate arm and plug 1350.

Various views of FIGS. 12 and 13 are shown as "see-through" cutaway views where solid walls may be shown as being hollow, for example, to more clearly illustrate contours of such walls, shapes of passages, etc.

Figure 14:
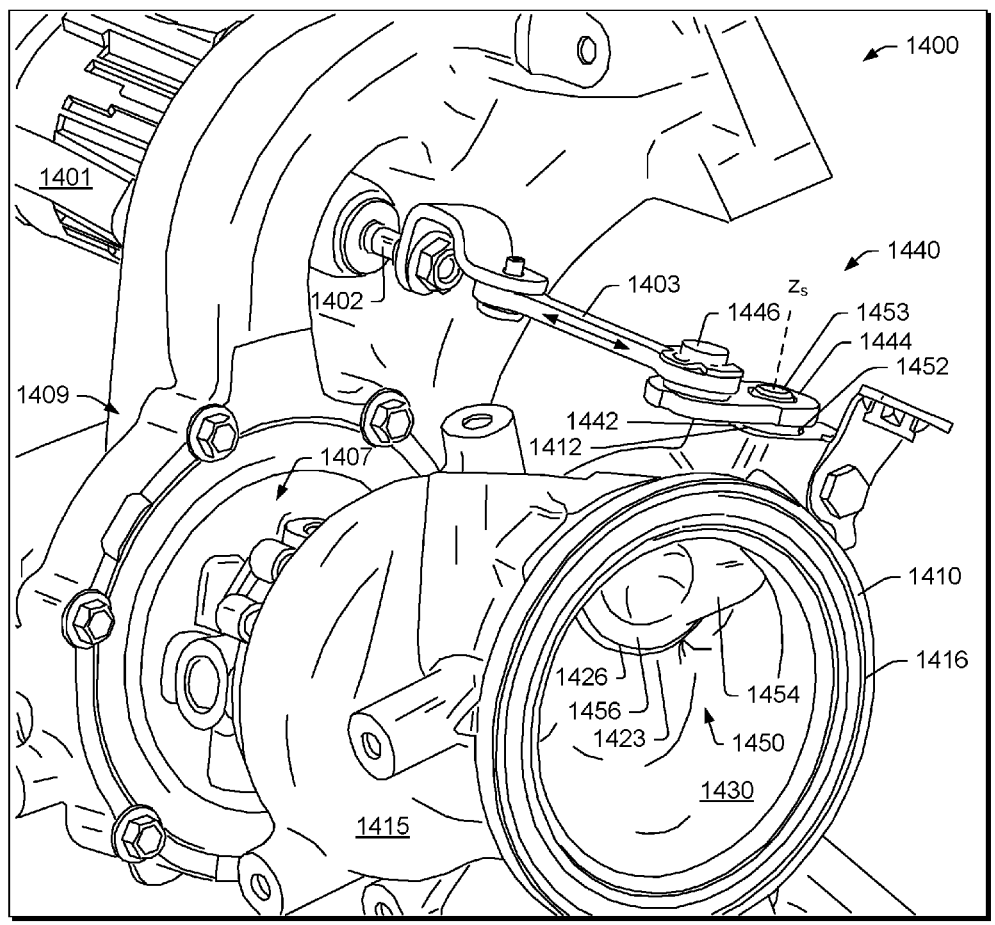
FIG. 14 is an example of an assembly that includes a wastegate.

FIG. 14 shows an example of an assembly 1400 that includes an actuator 1401, an actuation rod 1402, an actuator linkage 1403, a center housing 1407 (e.g., to house a bearing, bearings, etc. for a turbocharger shaft, etc.), a compressor housing 1409, a turbine housing 1410 that includes a bore 1412, a spiral wall 1415 (e.g., that defines, in part, a volute), an exhaust outlet opening 1416, a wastegate wall 1423 that extends to a wastegate seat 1426, and an exhaust chamber 1430.

In the example of FIG. 14, the turbine housing 1410 may be a single piece or multi-piece housing. As an example, the turbine housing 1410 may be a cast component (e.g., formed via sand casting or other casting process). As shown, the turbine housing 1410 includes various walls, which can define features such as the bore 1412, a turbine wheel opening, an exhaust outlet opening, the chamber 1430, etc. In particular, the wastegate wall 1423 defines a wastegate passage in fluid communication with an inlet conduit where a wastegate control linkage 1440 and a wastegate arm and plug 1450 are configured for opening and closing the wastegate passage (e.g., for wastegating exhaust).

In the example of FIG. 14, the wastegate control linkage 1440 includes a bushing 1442 configured for receipt by the bore 1412 of the turbine housing 1410, a control arm 1444 and a peg 1446 and the wastegate arm and plug 1450 includes a shaft 1452, a shaft end 1453, an arm 1454 and a plug 1456 (see, e.g., the wastegate arm and plug 250, 350, 750, etc.). As shown, the bushing 1442 is disposed between the bore 1412 and the shaft 1452, for example, to support rotation of the shaft 1452, to seal the chamber 1430 from an exterior space, etc. The bore 1412, the bushing 1442 and the shaft 1452 may each be defined by a diameter or diameters as well as one or more lengths.

As an example, the assembly 1400 may be fitted to an exhaust conduit or other component of an internal combustion engine (see, e.g., examples of FIG. 1) via a flange such that exhaust is received via an inlet conduit that may direct exhaust to a volute (e.g., or volutes) that may be defined at least in part by the spiral wall 1415. As an example, a volute (e.g., or volutes) may direct exhaust (e.g., via a nozzle or nozzles) to a turbine wheel disposed in the turbine housing 1410 where the exhaust may flow and expand in a turbine wheel space defined in part by the turbine housing 1410. Exhaust may then exit the turbine wheel space by flowing to the chamber 1430 and then out of the turbine housing 1410 via the exhaust outlet opening 1416.

As to wastegating, upon actuation of the control linkage 1440 (e.g., by the actuator linkage 1403 being operatively coupled to the peg 1446), the wastegate arm and plug 1450 may be rotated such that at least a portion of the received exhaust can flow in the wastegate passage defined by the wastegate wall 1423, past the wastegate seat 1426 and into the chamber 1430, rather than through a nozzle to a turbine wheel space. The wastegated portion of the exhaust may then exit the turbine housing 1410 via the exhaust outlet opening 1416 (e.g., and pass to an exhaust system of a vehicle, be recirculated in part, etc.).

As an example, the control linkage 1440 may exert a force that acts to force the plug 1456 in a direction toward the wastegate seat 1426. For example, the actuator 1401 may include a biasing mechanism (e.g., a spring, etc.) that exerts force, which may be controllably overcome, at least in part, for rotating the plug 1456 away from the wastegate seat 1426 (e.g., for wastegating). As an example, the actuator 1401 may be mounted to the assembly 1400. As an example, the actuator 1401 may be a linear actuator, for example, for moving the rod 1402 along an axis. Depending on orientation of a plug, a shaft, a control linkage and such a rod, to maintain the plug in a closed position, the rod may exert a downward force (e.g., away from the control linkage as in the example of FIG. 14) or the rod may exert an upward force (e.g., toward the control linkage). For example, where the control arm 1444 (e.g., and the peg 1446) of the control linkage 1440 are oriented on the same "side" as the plug 1456 with respect to the shaft 1452, a downward force applied to the control arm 1444 (e.g., via the peg 1446) may act to maintain the plug 1456 in a closed position with respect to the wastegate seat 1426; whereas, where, for example, an approximately 180 degree span exists between a plug and a control arm, an upward force applied to the control arm may act to maintain the plug in a closed position with respect to a wastegate seat.

As an example, the rod 1402 of the actuator 1401 may be biased to exert a force on the control linkage 1440 that causes the control linkage 1440 to exert a force on the plug 1456 such that the plug 1456 seats against the wastegate seat 1426. In such an example, the actuator 1401 may at least in part overcome the force that biases the rod 1402 such that the shaft 1452 rotates the plug 1456 away from the wastegate seat. For example, in FIG. 14, to initiate wastegating, the entire plug 1456 rotates about an axis of the shaft 1452 and moves away from the wastegate seat 1426 (e.g., without any portion of the plug 1456 moving into a wastegate opening defined by the wastegate seat 1426). As an example, the moving away of the plug 1456 may be facilitated by exhaust pressure. For example, in a closed position, the plug 1456 experiences a pressure differential where pressure is higher below the plug 1456 and less above the plug 1456. In such an example, the pressure below the plug 1456 acts in a direction that is countered by the closing force applied to the plug 1456 via the control linkage 1440 (e.g., the pressure differential acts to bias the plug 1456 toward an open position). Accordingly, the closing force applied to the plug 1456 should overcome pressure force from below the plug 1456. Further, where the shaft 1452 may include some play (e.g., axial play, etc.), the closing force applied to the plug 1456 may cause the plug 1456 to move with respect to the wastegate seat 1426.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a contact portion that contacts the wastegate seat to cover the wastegate passage in a closed state and a shell portion that extends into the wastegate passage in the closed state and that defines a clearance with respect to the wastegate seat in an open state. In such an example, the wastegate shaft, the wastegate arm and the wastegate plug may be a unitary component.

As an example, a shell portion of a wastegate plug may be or include an approximately hemispherical shell. As an example, a contact portion of a wastegate plug may be or include a radiused surface.

As an example, a wastegate seat may include a profile defined in part by a cone.

As an example, an assembly may include a control arm operatively coupled to a wastegate shaft. In such an example, an axial clearance may exist between a surface of the control arm and an end surface of a bushing that allows for self-centering of a contact portion of a wastegate plug with respect to a wastegate seat.

As an example, a wastegate shaft may include an axis and a bore may include an axis. In such an example, for a predetermined angular misalignment of the axes, a wastegate plug, along a contact portion, may contacts a wastegate seat to cover a wastegate passage (e.g., optionally via self-centering responsive to force).

As an example, a wastegate shaft may include an axis and a bore may include an axis. In such an example, for a predetermined displacement misalignment of the axes, a wastegate plug, along a contact portion, may contact a wastegate seat to cover a wastegate passage (e.g., optionally via self-centering responsive to force).

As an example, an assembly can include a turbine housing that includes a bore, a wastegate seat and two wastegate passages that extend to the wastegate seat; a rotatable wastegate shaft configured for receipt by the bore; a wastegate arm extending from the wastegate shaft; and a wastegate plug extending from the wastegate arm where the wastegate plug includes a contact portion that contacts the wastegate seat in a closed state and two shell portions that define clearances with respect to the wastegate seat in an open state. In such an example, at least the wastegate arm and the wastegate plug may be a unitary component.

As an example, each of two shell portions may be or include a portion of a substantially hemispherical shell.

As an example, a turbine housing may include a divider wall disposed between two wastegate passages. In such an example, a wastegate plug may include a gap between two shell portions where the gap accommodates the divider wall in the closed state of the two wastegate passages.

As an example, in a closed state of two wastegate passages, each of two shell portions of a wastegate plug may extend at least in part into a respective one of the wastegate passages.

As an example, an assembly may include a control arm operatively coupled to a wastegate shaft that is operatively coupled (e.g., optionally integral to) an arm and a plug where the plug includes a contact portion and two shell portions. In such an example, an axial clearance may exist between a surface of the control arm and an end surface of a bushing (e.g., that receives the shaft) where the axial clearance allows for self-centering of the contact portion of the wastegate plug with respect to the wastegate seat (e.g., axial movement of the shaft).

Figure 15:
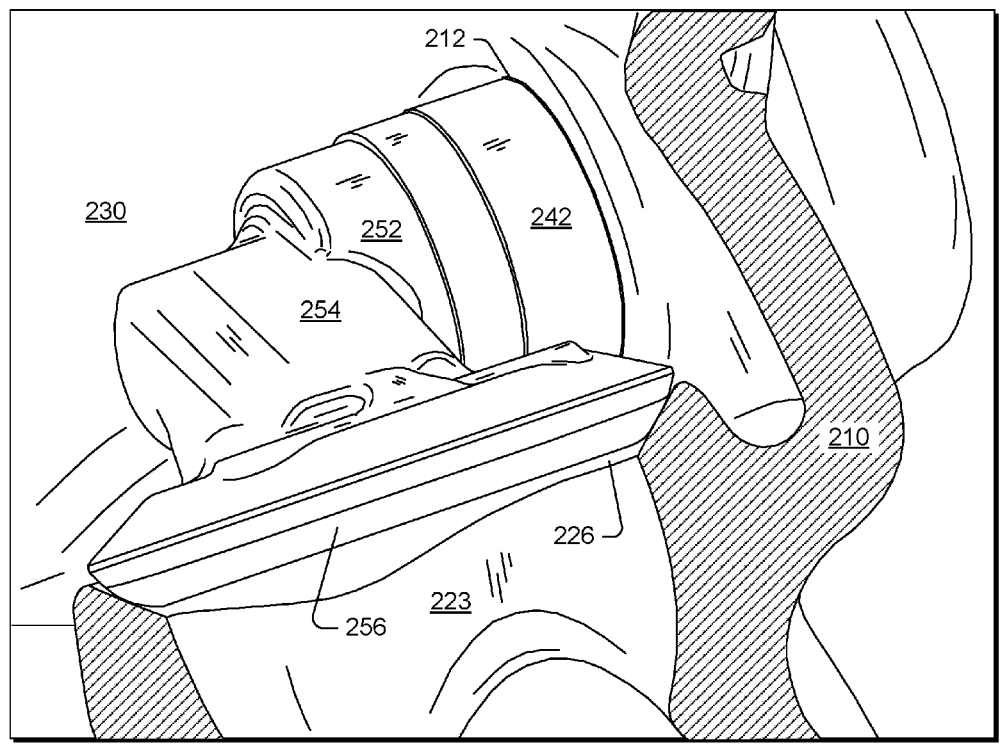
FIG. 15 is a cutaway view of a portion of the assembly of FIG. 2.

FIG. 15 shows an enlarged cutaway view of a portion of the assembly 200 of FIG. 2. As shown, the plug 256 seats in the wastegate seat 226 to seal the wastegate passage defined by the wastegate wall 223, which is part of the turbine housing 210.

Figure 16:
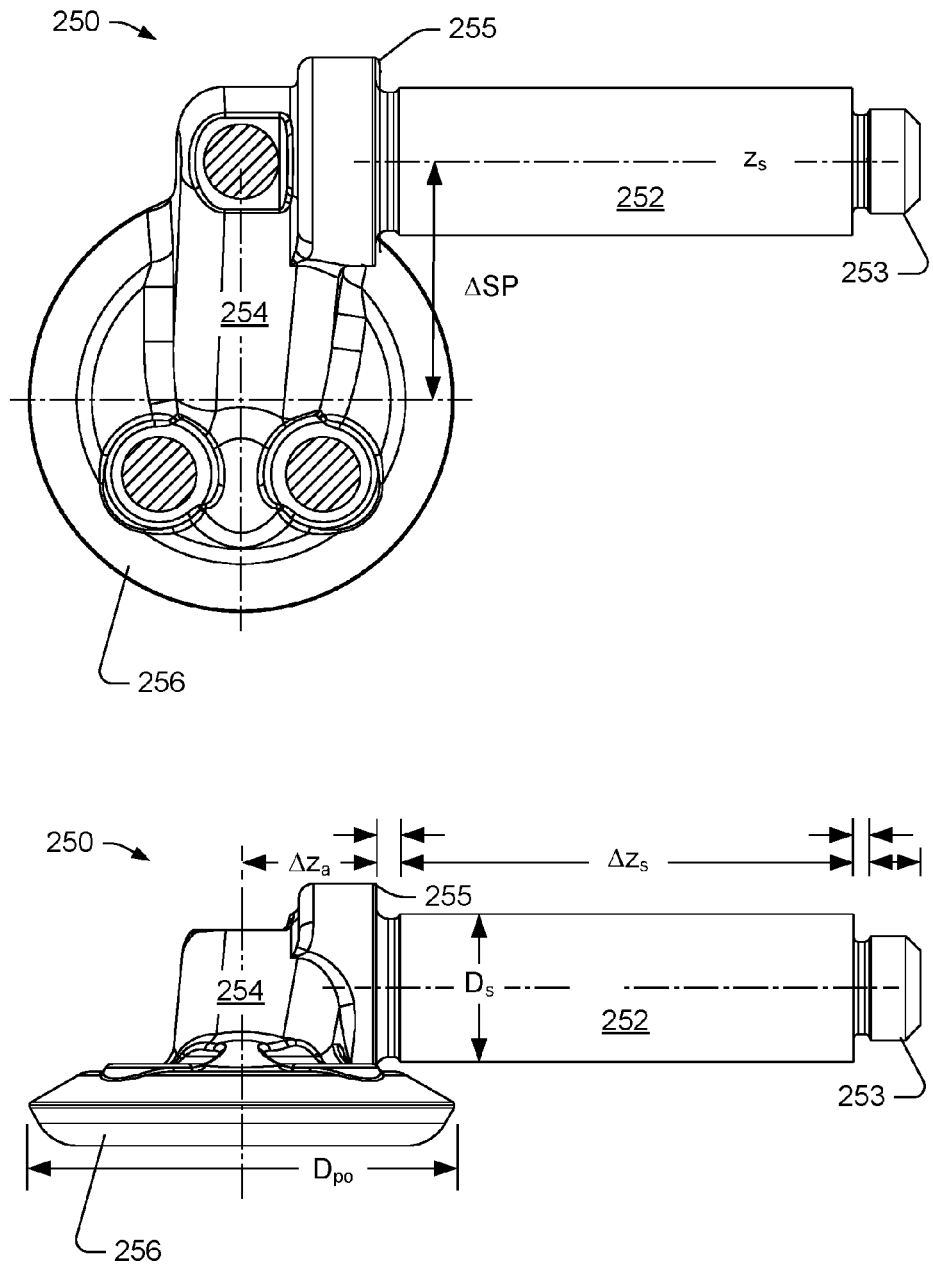
FIG. 16 is a series of views of an example of a wastegate arm and plug.

FIG. 16 shows a plan view and a side view of the wastegate arm and plug 250 of the assembly of FIG. 2. As shown, the shaft 252 has a diameter $D_s$ over a length $\Delta z_s$. The arm 254 extends axially outwardly away from the shaft 252 from a shoulder 255 and radially downwardly to the plug 256. An axial dimension $\Delta z_a$ is shown in the example of FIG. 16 as being a distance from the shoulder 255 to a centerline of the plug 256. The plug 256 is shown as having an outer diameter $D_{po}$. A dimension $\Delta$SP is shown in the plan view as an offset between the axis $z_s$ of the shaft 252 and the centerline of the plug 256. The dimension $\Delta$SP may be a leg of a triangle that, for example, defines a hypotenuse as a dimension between a rotational axis of the arm 254 and the centerline of the plug 256. FIG. 16 also shows various other features, for example, shaft features such as shoulders, contours, etc.

Figure 17:
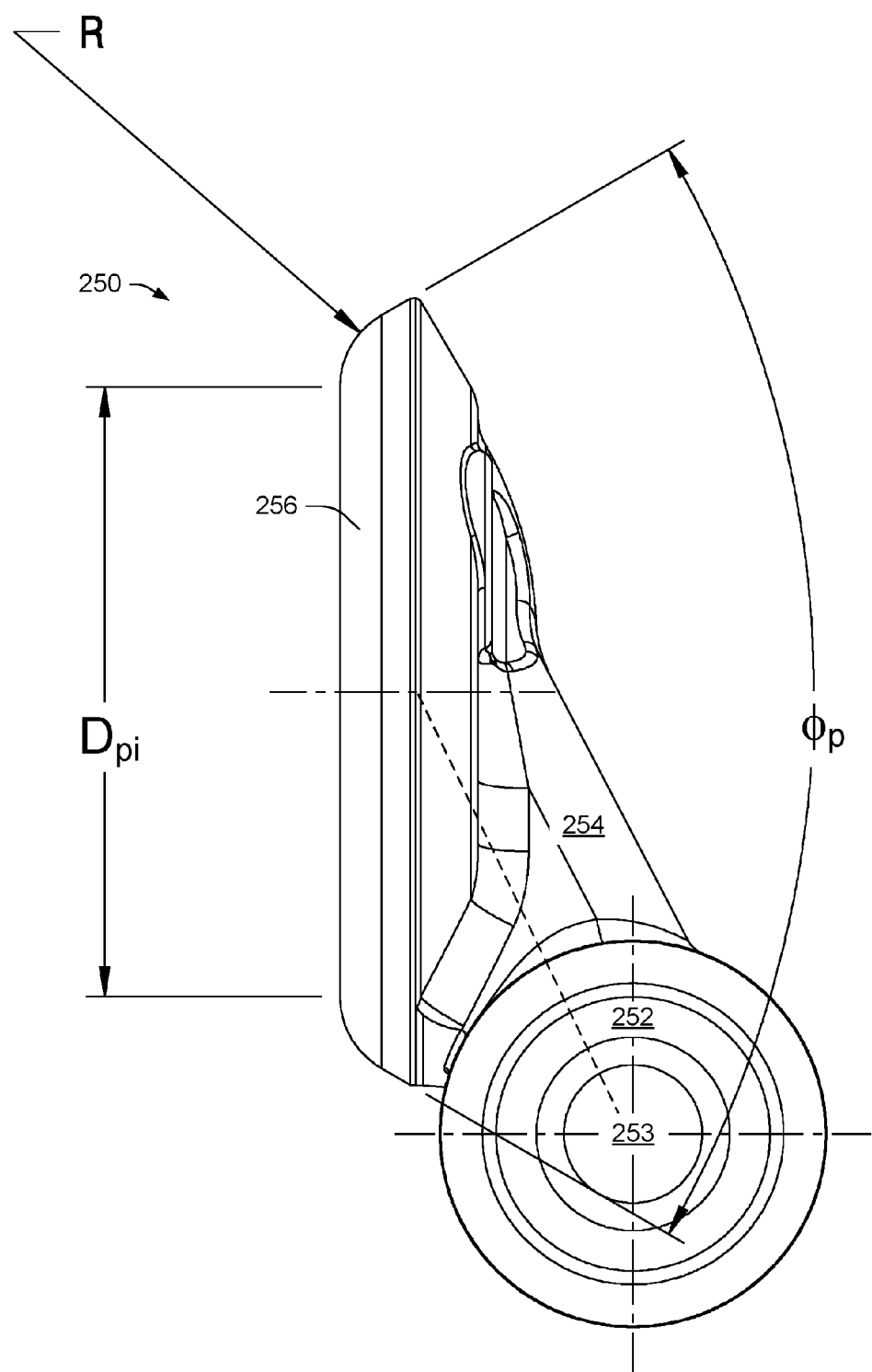
FIG. 17 is a side view of the wastegate arm and plug of FIG. 16.

FIG. 17 shows another side view of the wastegate arm and plug 250. In the example of FIG. 17, a profile of the plug 256 is illustrated that includes a conical portion and a radiused portion that may define an inner diameter $D_{pi}$. As shown, the conical portion may be defined according to a cone angle $\varphi_p$ while the radiused portion may be defined with respect to a radius R. As an example, the radiused portion may be referred to as a toroidal portion or a toroidal surface. While the toroidal portion extends to a conical portion in the example of FIG. 16, a toroidal portion may continue as a radiused portion or extend to a non-conical or other portion. As an example, a plug can include toroidal surface disposed between an inner diameter and an outer diameter of a plug (e.g., a toroidal surface disposed between $D_{pi}$ and $D_{po}$).

Figure 18:
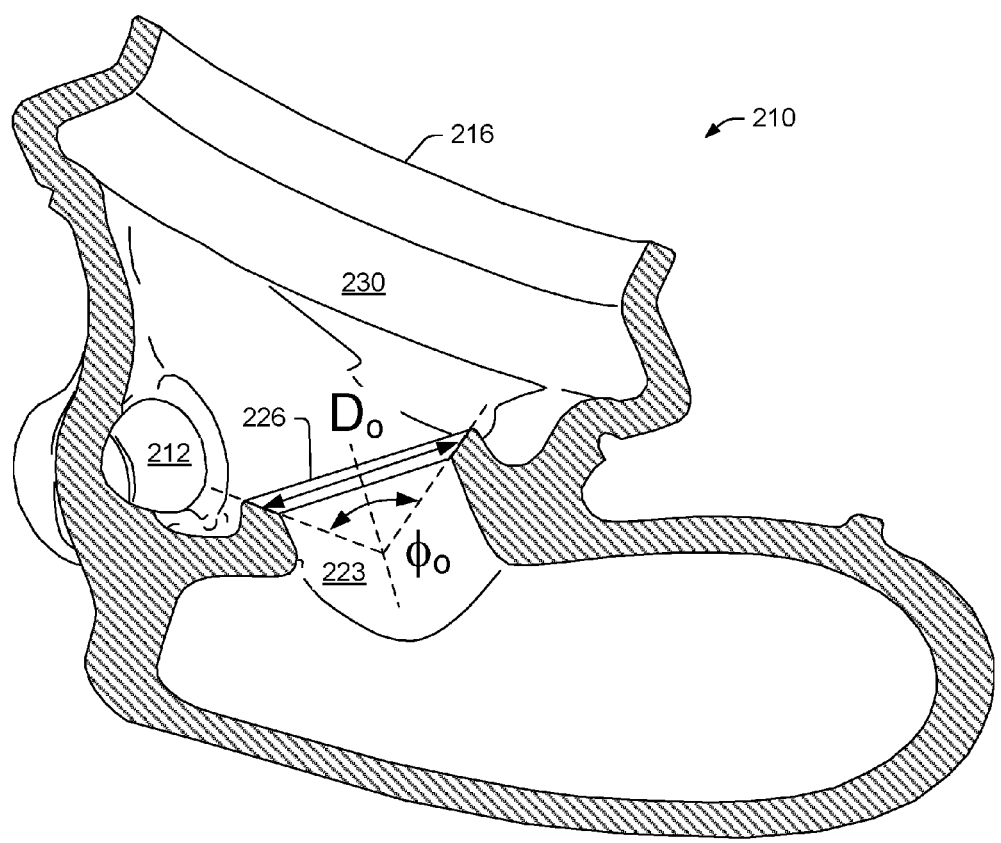
FIG. 18 is a cutaway view of an example of a turbine housing.

FIG. 18 shows a cutaway view of the turbine housing 210, particularly to show a relationship between the bore 212 and the wastegate seat 226 as these features cooperate with a wastegate arm and plug such as the wastegate arm and plug 250. As shown in the example of FIG. 6, the wastegate wall 223 extends to the wastegate seat 226, which includes a diameter $D_o$ of a cone section disposed at a cone angle $\varphi_o$. As an example, an assembly may include a plug with a cone portion having a cone angle of about 60 degrees while a wastegate seat includes a cone portion with a cone angle of about 100 degrees. In such an example, contact may or may not occur between the two cone portions as sealing may be achieved by contact between a toroidal portion of the plug and the cone portion of the wastegate seat.

As an example, a wastegate arm and plug may include extreme positions inside a bushing disposed in a bore of a turbine housing while being able to maintain contact with a wastegate seat for purposes of sealing a wastegate passage (e.g., adequate sealing for acceptable performance).

Figure 19:
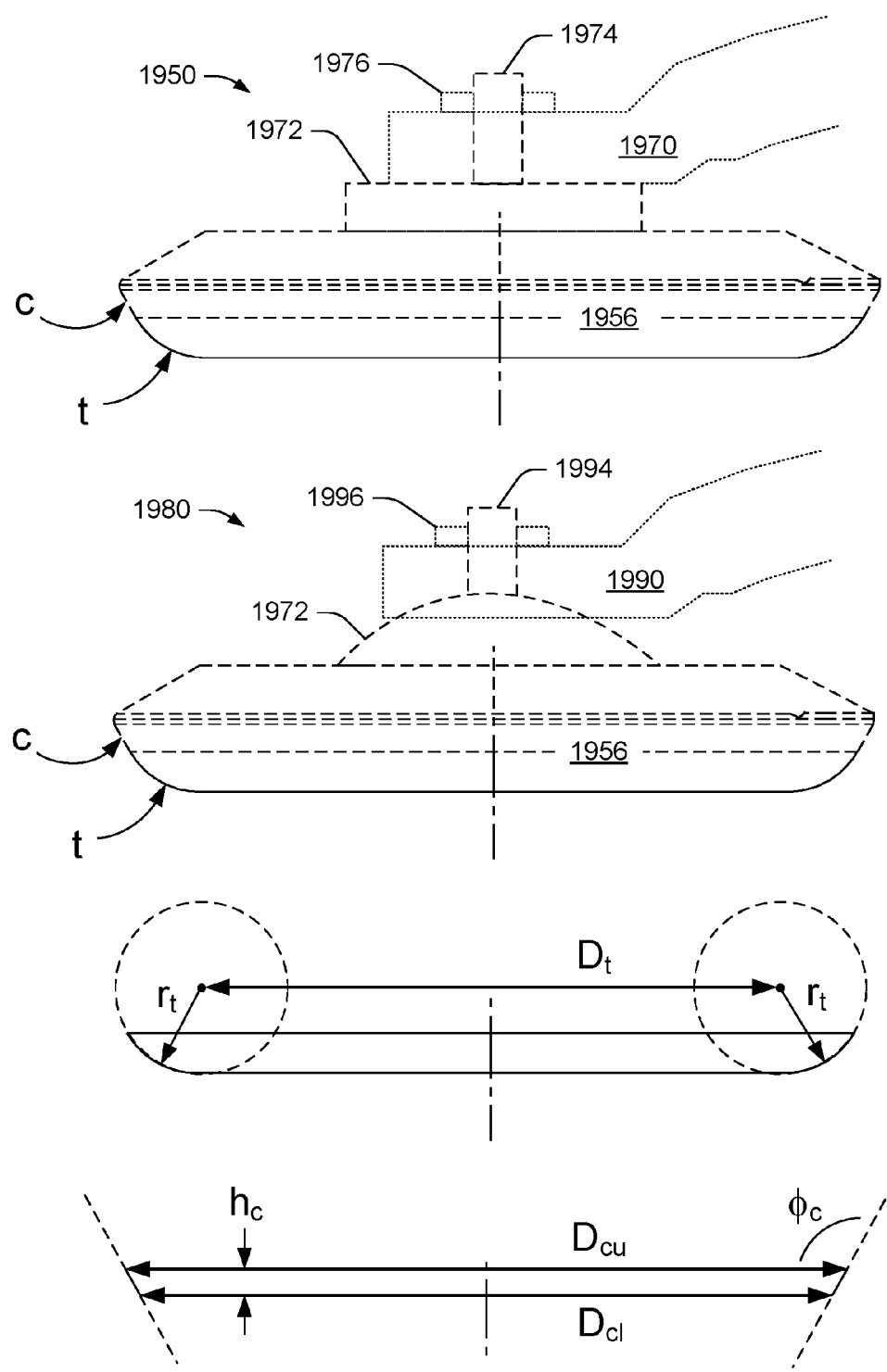
FIG. 19 is a series of diagrams of examples of wastegate arm and plug and profiles thereof.

FIG. 19 shows examples of a wastegate arm and plug 1950 and 1970, which may be a unitary wastegate arm and plug or a wastegate arm and plug assembly. As an assembly, a plug portion 1956 may include an attachment base 1972 or 1992 from which a stem 1974 or 1994 extends where an arm 1970 or 1990 fits to the stem 1974 or 1994, which is secured to the stem 1974 or 1994 via an attachment component 1976 or 1996 (e.g., a press-fit ring, etc.). In the example wastegate arm and plug 1970, a surface of an attachment base 1992 may be defined at least in part by a portion of a sphere. In such an example, the arm 1990 may include a surface defined at least in part by a portion of a sphere. In such an example, some pivoting may be provided for the plug portion 956 with respect to the arm 1990 (e.g., as provided by some amount of clearance or clearances with respect to the stem 1994).

In the example of FIG. 19, the plug portion 1956 includes a toroidal portion "t" and, for example, optionally a conical portion "c". As shown, the optional conical portion may be defined by an angle $\varphi_c$, a height $h_c$, and at least one of a lower diameter $D_{cl}$ and an upper diameter $D_{cu}$. In the example of FIG. 19, the toroidal portion may be defined by a diameter $D_t$ and a radius $r_t$, for example, where the toroidal portion may be defined by a circular torus.

Figure 20:
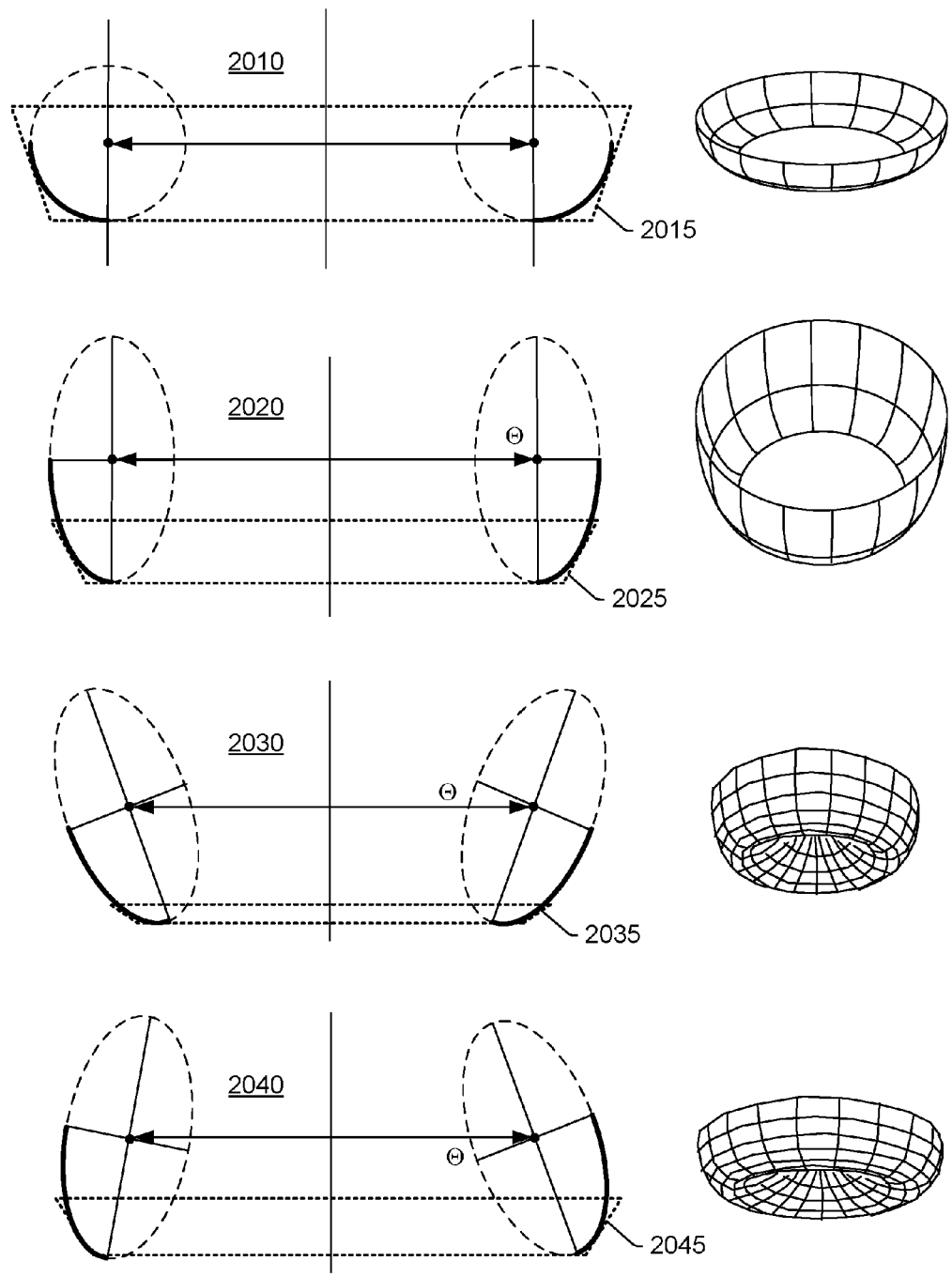
FIG. 20 is a series of views of examples of profiles of a plug.

FIG. 20 shows some examples of toroidal portion profiles of a plug 2010, 2020, 2030 and 2040 along with some examples of seat profiles 2015, 2025, 2035 and 2045. Also shown in FIG. 20 are gridded surfaces that may approximate respective toroidal portions.

As to the example profile 2010, the toroidal portion corresponds to a circle, as to the example profile 2020, the toroidal portion corresponds to an ellipse, as to the example profile 2030, the toroidal portion corresponds to an inwardly tilted ellipse and, as to the example profile 2040, the toroidal portion corresponds to an outwardly tilted ellipse. In the examples 2010, 2020, 2030 and 2040 of FIG. 20, a thick solid line represents a profile that may be a profile of a plug, for example, such as the plug 256. As to the seat profiles 2015, 2025, 2035 and 2045, the dotted lines may represent a profile that may be a profile of a seat, for example, such as the seat 226.

Figure 21:
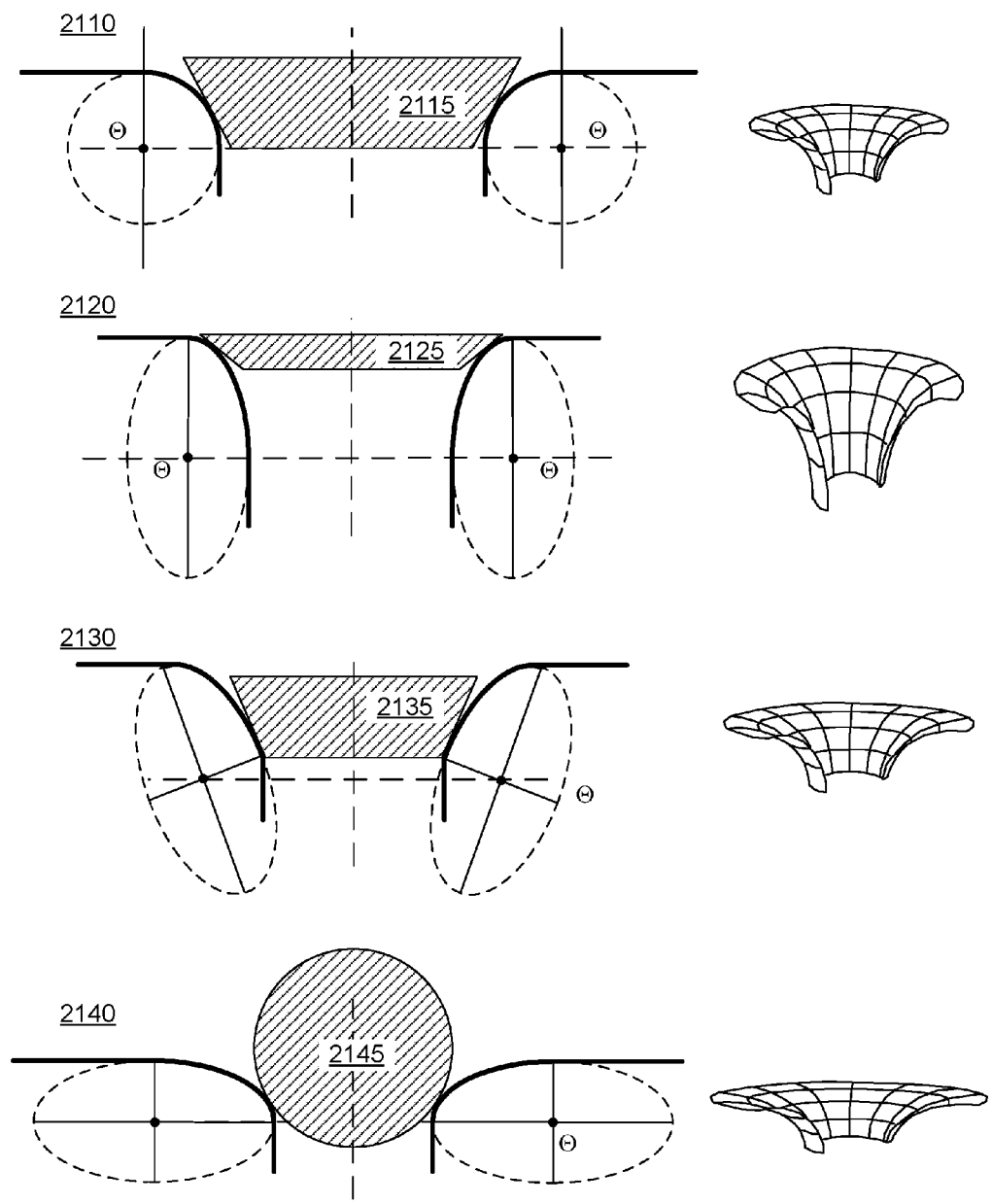
FIG. 21 is a series of views of examples of profiles of a seat.

FIG. 21 shows some examples of seat profiles of a wastegate seat 2110, 2120, 2130 and 2140 along with some examples of plug profiles 2115, 2125, 2135 and 2145. Also shown in FIG. 21 are gridded surfaces that may approximate respective seat profiles. As to the example profile 2110, the seat may be defined by a toroidal portion that corresponds to a circle, as to the example profile 2120, the seat may be defined by a toroidal portion that corresponds to an ellipse, as to the example profile 2130, the seat may be defined by a toroidal portion that corresponds to an outwardly tilted ellipse and, as to the example profile 2140, the seat may be defined by a toroidal portion that corresponds to an ellipse (e.g., rotated 90 degrees in comparison to the example 2120). In the examples 2110, 2120, 2130 and 2140 of FIG. 21, a thick solid line represents a profile that may be a profile of a seat, for example, such as the seat 226. As to the plug profiles 2115, 2125, 2135 and 2145, they may be a profile of a plug, for example, such as the plug 256. As shown in FIG. 21, a plug may include a conical profile or a spherical profile. As shown in various other examples, a plug may include a toroidal profile.

Figure 22:
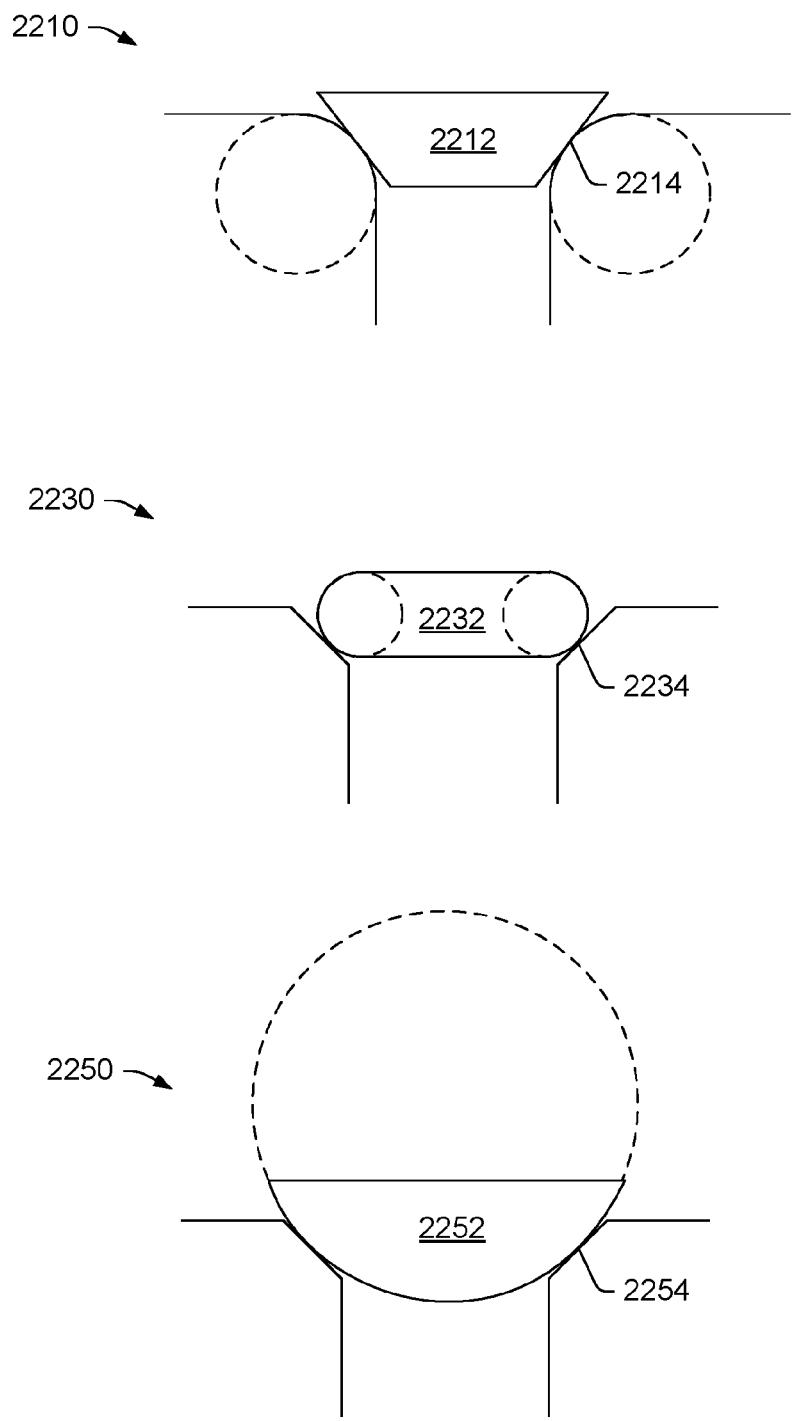
FIG. 22 is a series of views of examples of turbine wastegate plugs and seats.

FIG. 22 shows some examples of turbine wastegates 2210, 2230 and 1250. In the example 1210, a plug 1212 includes a conical shape and a seat 2214 includes a radiused shape (e.g., a portion of a toroidal surface). In the example 2230, a plug 2232 includes a radiused shape (e.g., a portion of a torodial surface) and a seat 2234 includes a conical shape. In the example 2250, a plug 2252 includes a radiused shape (e.g., a portion of a spherical surface) and a seat 2254 includes a conical shape. In the examples of FIG. 22, a torus may be defined by a radius (or major and minor axes) and a diameter and a sphere may be defined by a radius; noting that a spherical section may be defined by a surface cutting a sphere. As an example, a cone or conical portion may be defined by an angle and an axis and, for example, a position or positions along the axis.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a torus, for contacting the wastegate seat to cover the wastegate passage. In such an assembly, the wastegate shaft, the wastegate arm and the wastegate plug may be a unitary component.

As an example, a wastegate plug can include a profile defined in part by a portion of a cone. As an example, a wastegate seat can include a profile defined in part by a cone.

As an example, wastegate plug can include a profile defined in part by a portion of the torus where that portion is disposed between an inner diameter and an outer diameter of the wastegate plug.

As an example, an assembly can include a wastegate shaft with an axis where a turbine housing includes a bore with an axis. In such an example, for a predetermined angular misalignment of the axes, a wastegate plug connected to the wastegate shaft can include a profile defined in part by a portion of a torus where along that profile, the wastegate plug provides for contacting a wastegate seat to cover a wastegate passage.

As an example, an assembly can include a wastegate shaft with an axis where a turbine housing includes a bore with an axis. In such an example, for a predetermined displacement misalignment of the axes, a wastegate plug connected to the wastegate shaft can include a profile defined in part by a portion of a torus where along that profile, the wastegate plug provides for contacting a wastegate seat to cover a wastegate passage.

As an example, a wastegate plug may include a profile defined in part by a torus, for example, an elliptical torus having a minor axis length that differs from a major axis length. In such an example, an elliptical torus may include a tilt angle (e.g., where the major axes are not parallel).

As an example, a profile of a wastegate plug can include a conical angle defined by a tangent to a maximum outer diameter of the torus. In such an example, a wastegate seat can include a conical angle where the conical angle of the wastegate seat exceeds the conical angle of the wastegate plug.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a sphere, for contacting the wastegate seat to cover the wastegate passage. In such an example, the wastegate shaft, the waste-gate arm and the wastegate plug may be a unitary component. As an example, a wastegate seat can include a profile defined in part by a cone while a wastegate plug can include a profile defined at least in part by a sphere. As an example, a wastegate shaft can include an axis and a bore for receipt of the wastegate shaft can include an axis where, for a predetermined displacement misalignment of the axes, a wastegate plug, along a profile defined in part by at least a portion of a sphere, provides for contacting a wastegate seat to cover a wastegate passage. In such an example, the wastegate seat may include a portion defined at least in part by a cone.

As an example, an assembly can include a turbine housing that includes a bore, a wastegate seat and a wastegate passage that extends to the wastegate seat, where the wastegate seat includes a profile, defined in part by a portion of a torus; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a cone, for contacting the wastegate seat to cover the wastegate passage. In such an example, the wastegate shaft, the wastegate arm and the wastegate plug may be a unitary component. As an example, a portion of a torus can include a portion of an elliptical torus having a minor axis length that differs from a major axis length. In such an example, the elliptical torus may include a tilt angle.

As an example, a wastegate shaft can include an axis and a bore for receipt of the wastegate shaft may include an axis where, for a predetermined displacement misalignment of the axes, a wastegate plug, along a profile defined in part by a portion of the cone, provides for contacting a wastegate seat, along a profile defined in part by a portion of a torus, to cover a wastegate passage.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

The invention claimed is:

1. A turbocharger wastegate assembly comprising:
 a turbine housing that comprises a chamber, a wastegate passage, a wastegate seat disposed about an opening of the wastegate passage, and a bore, wherein the wastegate seat comprises a conical portion that comprises a conical surface that extends at a cone angle from an upper diameter on a chamber side to a smaller lower diameter on a wastegate passage side and wherein the bore comprises an interior opening to the chamber, an exterior opening, an axial length between the interior opening and the exterior opening and a bore diameter;
 a bushing that comprises a bushing bore, an exterior end, an interior end, a bushing bore diameter, an exterior surface diameter that is less than the bore diameter of the bore of the turbine housing and an axial length that is greater than the axial length of the bore of the turbine housing; and
 a monoblock wastegate flapper valve that comprises a shaft, a shoulder, an arm and a plug, wherein the shaft comprises an axial length that extends from the shoulder to an exterior end of the shaft and that exceeds the axial length of the bushing, wherein the shaft comprises a shaft diameter that is less than the bushing bore diameter, wherein the shoulder comprises a diameter that is greater than the bushing bore diameter, wherein the plug comprises an outer diameter that is less than the axial length of the shaft, wherein the outer diameter of the plug defines a plug axis, wherein the arm extends from the shaft to the plug along a direction from a rotational axis of the shaft to the plug axis wherein the direction is orthogonal to the rotational axis of the shaft, and wherein, in an assembled state, the interior end of the bushing is disposed in the chamber and the exterior end of the bushing is disposed in an exterior space, wherein the interior end of the bushing and the shoulder of the monoblock wastegate contact to limit axial movement of the monoblock wastegate and wherein, in a closed orientation, a portion of the plug contacts the conical surface of the conical portion of the wastegate seat.

2. The turbocharger wastegate assembly of claim 1 wherein the plug axis is disposed an axial distance from the shoulder that is less than one-half of the outer diameter of the plug.

3. The turbocharger wastegate assembly of claim 1 comprising a control arm wherein, in the assembled state, the control arm is attached to the exterior end of the shaft of the monoblock wastegate.

4. The turbocharger wastegate assembly of claim 3 wherein, in the assembled state, the bushing is disposed axially between the shoulder of the monoblock wastegate and the control arm.

5. The turbocharger wastegate assembly of claim 4 wherein, in the assembled state, an axial clearance exists between the exterior end of the bushing and the control arm.

6. The turbocharger wastegate assembly of claim 5 comprising an actuator coupled to the control arm.

7. The turbocharger wastegate assembly of claim 1 wherein the conical surface of the conical portion of the wastegate seat is defined in part by a cone height.

8. A turbocharger wastegate assembly comprising:
a turbine housing that comprises a chamber, a wastegate seat, and a bore, wherein the wastegate seat comprises a conical portion and wherein the bore comprises an interior opening to the chamber, an exterior opening, an axial length between the interior opening and the exterior opening and a bore diameter;
a bushing that comprises a bushing bore, an exterior end, an interior end, a bushing bore diameter, an exterior surface diameter that is less than the bore diameter of the bore of the turbine housing and an axial length that is greater than the axial length of the bore of the turbine housing; and
a monoblock wastegate that comprises a shaft, a shoulder, an arm and a plug, wherein the shaft comprises an axial length that extends from the shoulder to an exterior end of the shaft and that exceeds the axial length of the bushing, wherein the shaft comprises a shaft diameter that is less than the bushing bore diameter, wherein the shoulder comprises a diameter that is greater than the bushing bore diameter, wherein the plug comprises an outer diameter that is less than the axial length of the shaft, wherein the outer diameter of the plug defines a plug axis, wherein the plug axis is disposed a distance from a rotational axis of the shaft that is orthogonal to the rotational axis of the shaft, wherein the plug axis is disposed an axial distance from the shoulder that is less than one-half of the outer diameter of the plug, and wherein, in an assembled state, the interior end of the bushing is disposed in the chamber and the exterior end of the bushing is disposed in an exterior space, wherein the interior end of the bushing and the shoulder of the monoblock wastegate contact to limit axial movement of the monoblock wastegate and wherein, in a closed orientation, a portion of the plug contacts the conical portion of the wastegate seat.

* * * * *